US012734611B2

(12) United States Patent
Medya et al.

(10) Patent No.: US 12,734,611 B2
(45) Date of Patent: Sep. 15, 2026

(54) SYSTEM AND METHOD FOR FINISHING A SURFACE OF A WORKPIECE

(71) Applicants: ROLLS-ROYCE PLC, London (GB); ROLLS-ROYCE DEUTSCHLAND LTD & CO KG, Blankenfelde-Mahlow (DE)

(72) Inventors: Saikat Medya, Singapore (SG); Swee Hock Yeo, Singapore (SG); Arun Prasanth Nagalingam, Singapore (SG); Vijay Santhanam, Singapore (SG); Abhay Gopinath, Singapore (SG); Thomas Haubold, Wehrheim (DE)

(73) Assignees: ROLLS-ROYCE PLC, London (GB); ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 602 days.

(21) Appl. No.: 18/226,993

(22) Filed: Jul. 27, 2023

(65) Prior Publication Data

US 2024/0066633 A1 Feb. 29, 2024

(30) Foreign Application Priority Data

Aug. 24, 2022 (GB) ..................................... 2212286

(51) Int. Cl.
*B23K 26/352* (2014.01)
*B23K 26/06* (2014.01)
(Continued)

(52) U.S. Cl.
CPC ........ *B23K 26/352* (2015.10); *B23K 26/0604* (2013.01); *B23K 26/0622* (2015.10);
(Continued)

(58) Field of Classification Search
CPC .............. B23K 26/0624; B23K 26/146; B23K 26/352-3584; B23K 26/122
See application file for complete search history.

(56) References Cited

U.S. PATENT DOCUMENTS

2007/0297060 A1 12/2007 Bastawros et al.
2017/0036253 A1* 2/2017 Lukac .................... A61B 18/26
(Continued)

FOREIGN PATENT DOCUMENTS

CN 103849757 A * 6/2014
CN 104440584 A * 3/2015 ............... B24C 1/08
(Continued)

OTHER PUBLICATIONS

Feb. 14, 2023 Search Report issued in British Patent Application No. 2212286.5.
(Continued)

*Primary Examiner* — Topaz L. Elliott
(74) *Attorney, Agent, or Firm* — Oliff PLC

(57) ABSTRACT

A system for finishing a surface of a workpiece. The system includes a laser unit configured to emit a laser radiation. The system further includes an attenuator disposed within the laser unit and configured to adjust optical parameters of the laser radiation. The system further includes a cavitation chamber storing a liquid medium. The workpiece is mounted within the cavitation chamber and is in contact with the liquid medium. The system further includes at least one lens configured to focus at least a portion of the laser radiation and transmit at least one laser beam towards the workpiece.

12 Claims, 17 Drawing Sheets

(51) Int. Cl.

| | |
|---|---|
| ***B23K 26/0622*** | (2014.01) |
| ***B23K 26/064*** | (2014.01) |
| ***B23K 26/122*** | (2014.01) |
| ***B23K 26/57*** | (2014.01) |
| ***B23K 26/70*** | (2014.01) |

(52) U.S. Cl.

CPC ...... *B23K 26/0643* (2013.01); *B23K 26/0648* (2013.01); *B23K 26/122* (2013.01); *B23K 26/57* (2015.10); *B23K 26/705* (2015.10)

(56) References Cited

U.S. PATENT DOCUMENTS

| | | | | |
|---|---|---|---|---|
| 2019/0233321 | A1* | 8/2019 | Ellison | B23K 26/009 |
| 2022/0161387 | A1 | 5/2022 | Yeo et al. | |
| 2023/0311244 | A1* | 10/2023 | Coyle | B23K 26/032 219/121.67 |

FOREIGN PATENT DOCUMENTS

| | | | | | |
|---|---|---|---|---|---|
| CN | 104942442 | A | | 9/2015 | |
| CN | 105855244 | A | | 8/2016 | |
| CN | 106271063 | A | * | 1/2017 | B23K 26/36 |
| CN | 110625261 | A | * | 12/2019 | B23K 26/352 |
| CN | 113102884 | A | * | 7/2021 | B23K 26/0622 |
| CN | 114346337 | A | * | 4/2022 | B23K 26/0624 |
| CN | 114653672 | A | | 6/2022 | |
| CN | 114871569 | A | | 8/2022 | |
| GB | 2547862 | A | * | 8/2017 | B23K 26/362 |
| JP | 2013-211415 | A | | 10/2013 | |

OTHER PUBLICATIONS

X.D. Ren et al. "Mechanical Effect of Laser-Induced Cavitation Bubble of 2A02 Alloy". Optics and Laser Technology, 2018, vol. 105, pp. 180-184.

X.C. Zhang et al. "Improvement of Fatigue Life Of Ti—6Al—4V Alloy By Laser Shock Peening". Materials Science and Engineering A, 2010, vol. 527, pp. 3411-3415.

Emil-Alexandru Brujan et al. "Dynamics of Laser-Induced Cavitation Bubbles Near an Elastic Boundary". Journal of Fluid Mechanics, 2001, vol. 433, pp. 251-281.

W.D. Song et al. "Laser-Induced Cavitation Bubbles for Cleaning of Solid Surfaces". Journal of Applied Physics, Mar. 15, 2004, vol. 95, No. 6, pp. 2952-2956.

Feb. 12, 2024 Search Report issued in European Patent Application No. 23187283.9.

* cited by examiner

600

602 MOUNT WORKPIECE WITHIN CAVITATION CHAMBER

604 EMIT LASER RADIATION

606 ADJUST OPTICAL PROPERTIES OF LASER RADIATION

608 RECEIVE AT LEAST PORTION OF LASER RADIATION FROM LASER UNIT AND FOCUS LASER RADIATION TO TRANSMIT AT LEAST ONE LASER BEAM TOWARDS WORKPIECE

SYSTEM AND METHOD FOR FINISHING A SURFACE OF A WORKPIECE

CROSS-REFERENCE TO RELATED APPLICATIONS

This specification is based upon and claims the benefit of priority from United Kingdom patent application number GB 2212286.5 filed on Aug. 24th 2022, the entire contents of which is incorporated herein by reference.

BACKGROUND

1. Field of the Disclosure

The present disclosure generally relates to finishing a surface of a workpiece, and in particular to a system and a method for finishing a surface of a workpiece.

2. Description of the Related Art

Components of an aircraft engine, such as a gas turbine engine, are typically made by various processes, for example, additive manufacturing. After manufacturing, the surfaces of such components need to be finished (e.g., smoothed and/or cleaned) for satisfactory operation of such components and other related parts. The finishing involves removal of the material to achieve a desirable surface roughness. Some components have complex geometries, including complex internal structures or channels, which may be difficult to finish by already known cleaning and finishing methods.

The internal channels or structures can be finished by abrasive flow machining (AFM), but this technique is slow, and may result in accumulation of abrasive particles at bends and narrow passages, or contamination of the component with abrasive particles. Various known techniques of surface finishing, such as Electrophoretic deposition (EPD) Mechanical plating, Sputter deposition, and Physical vapor deposition (PVD), may provide adequate finishing of external surfaces of a component. However, such techniques may not provide desirable finishing of internal surfaces or bends in a component.

Further, the industrial standards and requirements for the surfaces of products have been greatly increased. The conventional finishing techniques may fail to achieve a sufficiently high-quality surface finish throughout the component. Therefore, there exists a need for a system and/or a method for improved finishing of a surface (e.g., an internal surface) of a component.

SUMMARY OF THE DISCLOSURE

According to a first aspect there is provided a system for finishing a surface of a workpiece. The system includes a laser unit configured to emit a laser radiation. The system further includes an attenuator disposed within the laser unit and configured to adjust optical parameters of the laser radiation. The system further includes a cavitation chamber storing a liquid medium. The workpiece is mounted within the cavitation chamber and is in contact with the liquid medium. The system further includes at least one lens configured to receive at least a portion of the laser radiation from the laser unit and focus the portion of the laser radiation to transmit at least one laser beam towards the workpiece. The system further includes a controller communicably coupled to the attenuator and configured to control the attenuator, such that a high-temperature plasma is generated within the cavitation chamber upon irradiation of the at least one laser beam through the liquid medium. The generation of the high-temperature plasma leads to generation of cavitation bubbles. An implosion of the cavitation bubbles causes finishing of the surface of the workpiece. The system further includes a Q-switch disposed within the laser unit. The controller is further to control the Q-switch and the attenuator to operate the laser unit in a pulse mode based on a breakdown threshold of the liquid medium. The high-temperature plasma is generated upon optical breakdown in the liquid medium via the at least one laser beam.

For some wavelengths of the laser radiation, the controller may adjust default settings of the attenuator. However, for some of the wavelengths of the laser radiation, the controller may not need to adjust the default settings of the attenuator. Thus, the attenuator may be a continuously variable energy control module.

The attenuator may provide the laser radiation with desirable optical characteristics based on various factors, such as density of the liquid medium, dimensions and geometry of the surface of the workpiece, a distance of the workpiece from the at least one lens, and so on. For example, an optical power of the laser radiation may be varied based on such factors for achieving a required finishing of the surface of the workpiece. Further, by modifying the optical power of the laser radiation, the high temperature and pressure of the plasma may also be attained based on the required finishing of the surface of the workpiece. Moreover, a quality of finishing of the surface is dependent on intensity of implosion of the cavitation bubbles which further depends on the generation of the high-temperature plasma.

Therefore, by including the attenuator, optical characteristics of the laser radiation may be improved so as to enable an improved quality of the finishing of the surface of the workpiece. Further, in contrast to conventional techniques of surface finishing, the system of the present disclosure may provide a desirable finishing of a surface irrespective of its geometrical and dimensional parameters. Moreover, while finishing an internal surface of a workpiece, as compared to already known techniques of surface finishing, a technique implemented by the system of the present disclosure may lead to minimal abrasives agglomeration and minimal accelerated abrasion on the internal surface of the workpiece. A dimensional integrity and thickness of the surface of the workpiece may also be maintained while finishing the surface by the system of the present disclosure.

In some embodiments, the laser unit is a solid-state laser. The solid-state laser is one that uses a crystal, whose atoms are rigidly bonded, unlike a gas. The solid-state laser may be neodymium:yttrium aluminium garnet (Nd:YAG) or Nd:glass. In general, a solid-state laser has a higher efficiency than some forms of gas lasers. Further, as the laser unit is the solid-state laser, the laser unit can be operated in a pulsed mode or a continuous mode.

With Q-switching, the laser unit can easily store an amount of energy which, when released in the form of a nanosecond light pulse, leads to a peak power. Generally, this peak power is of a magnitude above the achievable average power. A predetermined Q-switch delay may enable the laser unit to achieve pulse energies in the range of millijoule to joule and megawatt to gigawatt peak powers. The predetermined Q-switch delay may be selected based on the breakdown threshold of the liquid medium.

In some embodiments, the controller is further configured to control the Q-switch and the attenuator to regulate a pulse duration, a wavelength, a minimum average pulse energy for cavitation bubble generation, and a repetition frequency of the laser radiation. The pulse duration of the laser radiation is 5 nanoseconds (ns) to 6 ns. The wavelength of the laser radiation is 213 nanometres (nm) to 1064 nm. The minimum average pulse energy of the laser radiation for cavitation bubble generation is 0.5 millijoule (mJ) to 1 mJ. The repetition frequency of the laser radiation is 10 Hertz (Hz). Such regulation of the pulse duration, the wavelength, the minimum average pulse energy, and the repetition frequency of the laser radiation may be selected based on the breakdown threshold of the liquid medium and therefore enable the desirable generation of the high-temperature plasma within the cavitation chamber.

In some embodiments, the controller is further configured to control the Q-switch and the attenuator, such that a Q-switch delay is from 240 microseconds (μs) to 6 μs, a focusability of the laser radiation is less than or equal to 2 when the wavelength of the laser radiation is 1064 nm, and a diameter of the laser radiation is 8 mm to 10 mm. As the Q-switch delay is changed from 240 μs towards 6 μs, an intensity of cavitation bubble generation also increases. The Q-switch delay may be selected based on the breakdown threshold of the liquid medium.

In some embodiments, the system further includes an abrasive supply line configured to deliver a flow of abrasives to the surface of the workpiece so as to finish the surface of the workpiece by abrasion. With the flow of abrasives to the surface of the workpiece, a plasma mediated abrasive finishing of the surface may be achieved. The flow of abrasives may produce a synergistic effect on generation of microjets and enhance the finishing of the surface to remove impurities.

In some embodiments, the workpiece is at least partially hollow, and the surface is an internal surface of the at least partially hollow workpiece. The system of the present disclosure also enables the finishing of the internal surface of the at least partially hollow workpiece. For example, the system may provide finishing of internal surfaces of cylindrical tubes, hoses, curved pipes, and so on.

In some embodiments, the at least one laser beam irradiates through the liquid medium within the at least partially hollow workpiece, such that the high-temperature plasma and the cavitation bubbles are generated within the at least partially hollow workpiece so as to finish the internal surface of the at least partially hollow workpiece. The generation of the high-temperature plasma and the cavitation bubbles also results in generation of the microjets within the at least partially hollow workpiece. The generation of the microjets within the at least partially hollow workpiece may further enhance the finish of the internal surface of the at least partially hollow workpiece.

In some embodiments, the system further includes an energy measuring unit configured to receive the laser radiation from the laser unit. The energy measuring unit is configured to generate an energy signal indicating the optical parameters of the laser radiation adjusted by the attenuator and the controller. The energy measuring unit may include an energy meter and a pyroelectric sensor. In some cases, the energy signal may be received by the controller and the controller may control the attenuator based on the energy signal.

In some embodiments, the system further includes an ultrasonic generator configured to generate the cavitation bubbles in the liquid medium by ultrasonic excitation. Therefore, the cavitation bubbles may be generated by using the laser unit as well as the ultrasonic generator to create a combined or hybrid effect.

In some embodiments, the system further includes a splitter optically coupled to the laser unit and configured to split the laser radiation into a first split laser leam and a second split laser beam. The at least one lens includes a first lens configured to receive the first split laser beam and a second lens configured to receive the second split laser beam. The first lens is configured to focus the first split laser beam and the second lens is configured to focus the second split laser beam. The at least one laser beam includes a first laser beam and a second laser beam, such that the first laser beam is transmitted by the first lens by focusing the first split laser beam and the second laser beam is transmitted by the second lens by focusing the second split laser beam. As the first laser beam is transmitted by the first lens and the second laser beam is transmitted by the second lens, the high-temperature plasma is generated at two different locations within the cavitation chamber. The generation of the high-temperature plasma at two different locations may improve a speed of finishing the surface of the workpiece. Moreover, with the generation of the high-temperature plasma at two different locations, the system of the present disclosure may enable simultaneous finishing of surfaces of two workpieces, or two different surfaces of a single workpiece. The inclusion of the splitter, the first lens, and the second lens may enable the system to complete the finishing of the surface of the workpiece in a relatively less time as compared to conventional techniques of surface finishing. In the proposed system of the present disclosure, there may be no need to move the laser unit and other related units for finishing two different surfaces of the workpiece.

In some embodiments, the first lens and the second lens are disposed on two opposing sides of the cavitation chamber, such that the first lens faces the second lens, and the first laser beam and the second laser beam are substantially parallel to each other. As the first lens faces the second lens, the system of the present disclosure may enable finishing of the internal surface of the at least partially hollow workpiece from its two opposing ends.

In some embodiments, the system further includes at least three mirrors in total to direct the second split laser beam towards the second lens. The at least three mirrors may enable the finishing of the internal surface of the at least partially hollow workpiece from its two opposing ends.

In some embodiments, the first lens and the second lens are disposed on two inclined sides of the cavitation chamber, such that the first lens is inclined to the second lens, and the first laser beam and the second laser beam are inclined to each other. As the first lens is inclined to the second lens, the system of the present disclosure may enable finishing of an internal surface of a hollow curved workpiece from its two ends.

In some embodiments, the system further includes at least two mirrors in total to direct the second split laser beam towards the second lens. The at least two mirrors may enable the finishing of the internal surface of the hollow curved workpiece from its two ends.

In some embodiments, the workpiece is a hollow curved component, such that the generating of the cavitation bubbles finishes an internal curved surface of the hollow curved component. The hollow curved component may be a curved tube, a curved fitting, and so on.

In some embodiments, the at least one lens is a biconvex lens or a plano-convex lens. The biconvex lens or the plano-convex lens may focus and converge the at least one laser beam to a pre-defined point within the cavitation chamber.

According to a second aspect there is provided a method for finishing a surface of a workpiece. The method includes mounting the workpiece within a cavitation chamber. The cavitation chamber is filled with a liquid medium which is in contact with the workpiece. The method further includes emitting, via a laser unit, a laser radiation. The method further includes adjusting, via an attenuator, optical properties of the laser radiation. The attenuator is disposed within the laser unit. The method further includes receiving, via at least one lens, at least a portion of the laser radiation from the laser unit and focusing the laser radiation to transmit at least one laser beam towards the workpiece. Irradiation of the at least one laser beam through the liquid medium leads to generation of high-temperature plasma within the cavitation chamber. The method of the second aspect may be implemented by the system of the first aspect of the present disclosure. The method may provide an easier, effective, and efficient way for finishing external as well as internal surfaces of the workpiece.

In some embodiments, the generation of the high-temperature plasma further leads to generation of a primary shockwave at a predetermined location within the liquid medium. The generation of the high-temperature plasma further leads to generation of cavitation bubbles within the liquid medium upon generation of the primary shockwave. The generation of the high-temperature plasma further leads to implosion of the cavitation bubbles. The generation of the high-temperature plasma further leads to generation of a secondary shockwave upon the implosion of the cavitation bubbles. The generation of the high-temperature plasma further leads to generation and propagation of microjets upon generation of the secondary shockwave. The microjets impinge on the surface and thereby finish the surface of the workpiece.

In some embodiments, the workpiece is at least partially hollow, and the surface is an internal surface of the at least partially hollow workpiece.

In some embodiments, the method further includes generation of the high-temperature plasma within the at least partially hollow workpiece. The generation of the high-temperature plasma within the at least partially hollow workpiece further leads to generation of the primary shockwave within the at least partially hollow workpiece. The generation of the high-temperature plasma within the at least partially hollow workpiece further leads to generation of the cavitation bubbles within the at least partially hollow workpiece upon generation of the primary shockwave within the at least partially hollow workpiece. The generation of the high-temperature plasma within the at least partially hollow workpiece further leads to implosion of the cavitation bubbles within the at least partially hollow workpiece through interaction of the cavitation bubbles with the internal surface of the at least partially hollow workpiece and through interaction of the cavitation bubbles with each other. The generation of the high-temperature plasma within the at least partially hollow workpiece further leads to generation of the secondary shockwave within the at least partially hollow workpiece upon the implosion of the cavitation bubbles within the at least partially hollow workpiece. The generation of the high-temperature plasma within the at least partially hollow workpiece further leads to generation and propagation of the microjets within the at least partially hollow workpiece upon generation of the secondary shockwave within the at least partially hollow workpiece. The microjets impinge on the internal surface and thereby finish the surface of the at least partially hollow workpiece.

In some embodiments, the method further includes adjusting, via the attenuator, the optical properties of the laser radiation based on a distance between the at least one lens and a point of generation of the high-temperature plasma. The method further includes adjusting, via the attenuator, the optical properties of the laser radiation based on a distance between the point of generation of the high-temperature plasma and the workpiece. The method further includes adjusting, via the attenuator, the optical properties of the laser radiation based on a maximum radius of the cavitation bubbles. The method further includes adjusting, via the attenuator, the optical properties of the laser radiation based on a density of the liquid medium.

In some embodiments, the laser unit is a solid-state laser.

In some embodiments, the method further includes controlling a Q-switch and the attenuator to operate the laser unit in a pulse mode based on a breakdown threshold of the liquid medium. The high-temperature plasma is generated upon optical breakdown in the liquid medium via the at least one laser beam.

In some embodiments, controlling the Q-switch and the attenuator further includes regulating a pulse duration, a wavelength, a minimum average pulse energy for cavitation bubble generation, and a repetition frequency of the laser radiation. The pulse duration of the laser radiation is 5 nanoseconds (ns) to 6 ns. The wavelength of the laser radiation is 213 nanometres (nm) to 1064 nm. The minimum average pulse energy of the laser radiation for cavitation bubble generation is 0.5 millijoules (mJ) to 1 mJ. The repetition frequency of the laser radiation is 10 Hertz (Hz).

In some embodiments, the workpiece may be a component of a gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1 s, 105 Nkg-1 s, 100 Nkg-1 s, 95 Nkg-1 s, 90 Nkg-1 s, 85 Nkg-1 s or 80 Nkg-1 s. The specific thrust may be in an inclusive range bounded by any two of the values in the previous sentence (i.e. the values may form upper or lower bounds), for example in the range of from 80 Nkg-1 s to 100 Nkg-1 s, or 85 Nkg-1 s to 95 Nkg-1 s. Such engines may be particularly efficient in comparison with conventional gas turbine engines.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

As used herein, the term "configured to" and like is at least as restrictive as the term "adapted to" and requires actual design intention to perform the specified function rather than mere physical capability of performing such a function.

As used herein, the term "communicably coupled to" refers to direct coupling between components and/or indirect coupling between components via one or more intervening components. Such components and intervening components may comprise, but are not limited to, junctions, communication paths, wireless networks, components, circuit elements, circuits, functional blocks, and/or devices. As an example of indirect coupling, a signal conveyed from a first component to a second component may be modified by one or more intervening components by modifying the form, nature, or format of information in a signal, while one or more elements of the information in the signal are nevertheless conveyed in a manner than can be recognized by the second component.

The term "substantially", unless otherwise specifically defined, means to a high degree of approximation (e.g., within +/−10% for quantifiable properties) but again without requiring absolute precision or a perfect match.

Figure 1:
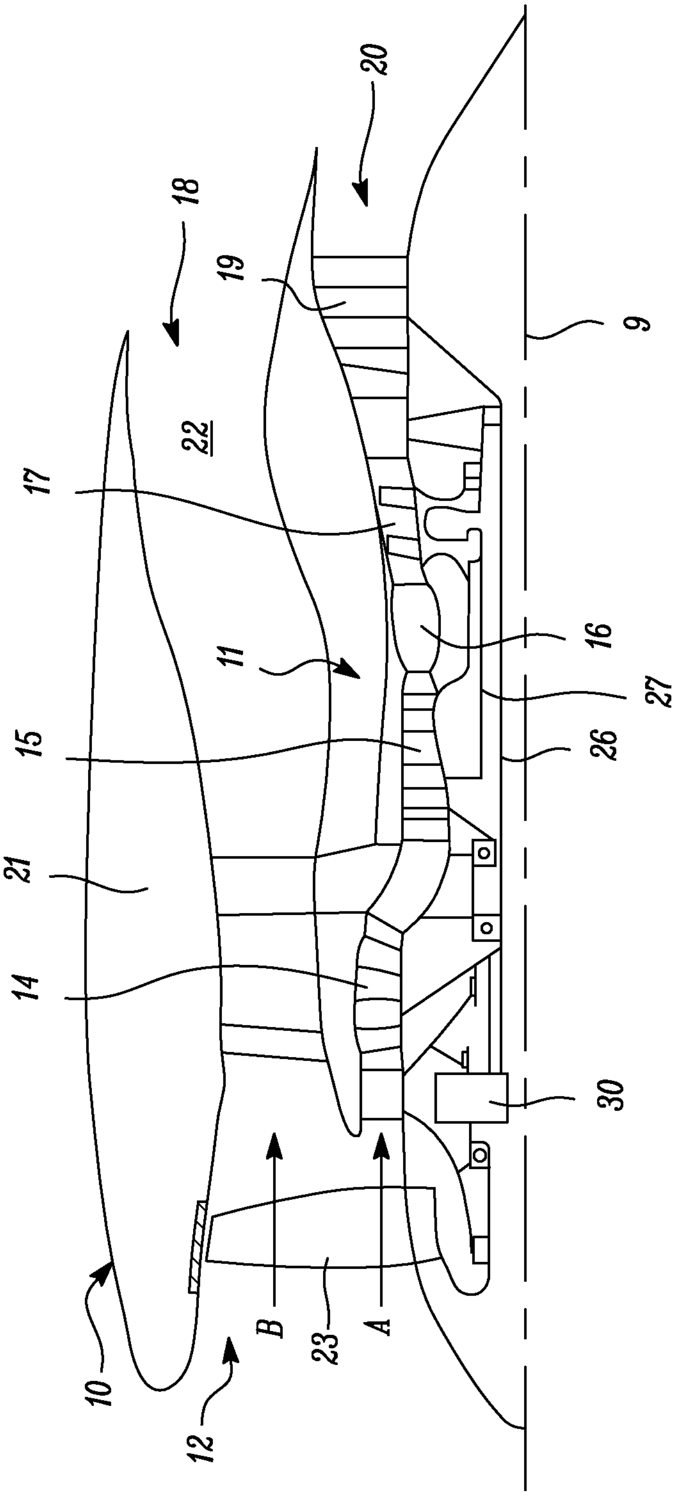
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
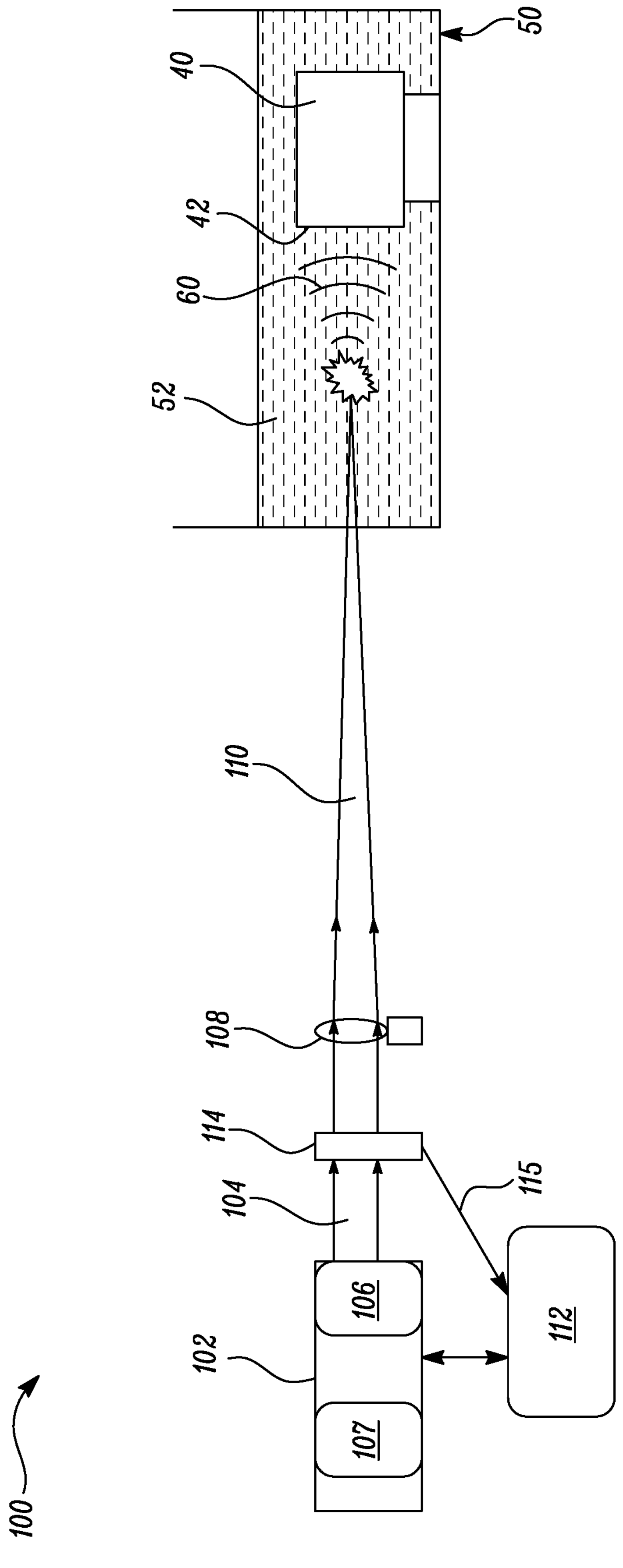
FIG. 2 is a schematic view of a system for finishing a surface of a workpiece, according to an embodiment of the present disclosure.

FIG. 2 is a schematic view of a system 100 for finishing a surface 42 of a workpiece 40, according to an embodiment of the present disclosure. In some embodiments, the workpiece 40 may be a component of the gas turbine engine 10 (shown in FIG. 1). In some cases, the workpiece 40 may be a solid component without any hollow region. In some cases, the workpiece 40 may be a component that has one or more hollow regions accessible from outside.

The system 100 includes a cavitation chamber 50 storing a liquid medium 52. The workpiece 40 is mounted within the cavitation chamber 50 and is in contact with the liquid medium 52. In some cases, the cavitation chamber 50 may be a vessel storing the liquid medium 52. The liquid medium 52 may be a pressurized liquid pumped by a liquid pressurisation unit (not shown) to the cavitation chamber 50. In an example, the liquid medium 52 is pressurised to around 250-350 bar, although it may be pressurised as high as 1,000 bar in some examples. The liquid medium 52 may be heated water.

The system 100 further includes a laser unit 102 configured to emit a laser radiation 104. In some embodiments, the laser unit 102 is a solid-state laser. The solid-state laser is one that uses a crystal, whose atoms are rigidly bonded, unlike a gas. The solid-state laser may be neodymium: yttrium aluminium garnet (Nd:YAG) or Nd:glass. Thus, the solid-state laser may use ytterbium oxide (Yb2O3) in disc form or as an internal coating in a fibre. In general, a solid-state laser has a higher efficiency than some forms of gas lasers. Further, as the laser unit 102 is the solid-state laser, the laser unit 102 can be operated in a pulsed mode or a continuous mode. Furthermore, a YAG laser (normally means Nd: YAG laser), a YVO4 laser, a YLF laser, a YAlO3 laser, a glass laser, a ruby laser, an alexandride laser, a Ti:sapphire laser, etc. are used as the solid-state lasers.

The system 100 further includes an attenuator 106 disposed within the laser unit 102. In general, the attenuator 106 (i.e., a modulator) is disposed in a laser resonance cavity (not shown) in the laser unit 102. The attenuator 106 is configured to adjust optical parameters of the laser radiation 104. The optical parameters of the laser radiation 104 may include, but not limited to, a power of the laser radiation, a phase of the laser radiation, a wavelength of the laser radiation, and so on. The system 100 further includes a Q-switch (107) disposed within the laser unit 102 that can perform Q-switching in the laser unit 102.

The Q-switch (107) may provide Q-switching in the laser unit 102 by either active or passive means. Examples of active Q-switching modulation means include acousto-optic modulators (AOMs) and electro-optic modulators (EOMs). The AOM comprises optical crystals, such as tellurium dioxide, crystalline quartz, and fused silica. The EOM comprises optical materials, such as potassium di-deuterium phosphate, beta barium borate (BBO), lithium niobate ($LiNbO3$), as well as $NH4H2PO4$ (ADP), and other material. With Q-switching, the laser unit 102 can easily store an amount of energy which, when released in the form of a nanosecond light pulse, leads to a peak power. Generally, this peak power is of a magnitude above the achievable average power of the laser radiation 104.

The system 100 further includes at least one lens 108 configured to receive at least a portion of the laser radiation 104 from the laser unit 102 and focus the portion of the laser radiation 104 to transmit at least one laser beam 110 towards the workpiece 40. In some embodiments, the at least one lens 108 is a biconvex lens or a plano-convex lens. Both the biconvex lens and the plano-convex lens have one or two surfaces with positive spherical contours. The at least one lens 108 may focus and converge the at least one laser beam 110 to a pre-defined point within the cavitation chamber 50.

The system 100 further includes a controller 112 communicably coupled to the attenuator 106 and configured to control the attenuator 106, such that a high-temperature plasma 54 (shown in FIG. 3A) is generated within the cavitation chamber 50 upon irradiation of the at least one laser beam 110 through the liquid medium 52. The controller 112 may be a programmable analog and/or digital device that can store, retrieve, and process data. In an application, the controller 112 may be include a processor, a control circuit, a computer, a workstation, a microprocessor, a microcomputer, a central processing unit, a server, and/or any suitable device or apparatus. The controller 112 may embody an electronic control module that may be present onboard the system 100. The controller 112 may include one or more memories (not shown).

In some embodiments, the controller 112 is further configured to control the Q-switch (107) and the attenuator (106) to operate the laser unit 102 in a pulse mode based on a breakdown threshold of the liquid medium 52. The high-temperature plasma 54 (shown in FIG. 3A) is generated upon optical breakdown in the liquid medium 52 via the at least one laser beam 110. For the liquid medium 52, optical breakdown may refer to a minimum energy density required for generation of the high-temperature plasma 54 and may depend on the state of aggregation of the liquid medium 52. The optical breakdown in the liquid medium 52 is a process of the stimulated coalescence of clusters by the at least one laser beam 110, which is accompanied by a light flash (laser spark), generation of spherical acoustic waves, and generation of cavitation bubbles 58 (shown in FIG. 3C), and the yield of liquid evaporation products.

In some embodiments, the controller 112 is further configured to control the Q-switch (107) and the attenuator (106) to regulate a pulse duration of the laser radiation 104, such that the pulse duration of the laser radiation 104 is 5 nanoseconds (ns) to 6 ns. In other embodiments, the pulse duration of the laser radiation 104 is 6 ns to 8 ns. The controller 112 is further configured to control the Q-switch (107) and the attenuator (106) to regulate a wavelength of the laser radiation 104, such that the wavelength of the laser radiation 104 is 213 nanometres (nm) to 1064 nm. Specifically, the controller 112 is configured to control wavelength separation modules (not shown) to regulate the wavelength of the laser radiation 104. In an example, a combination of different wavelengths of the laser radiation 104 in the range of 213 nm to 1064 nm may also be used. The controller 112 is further configured to control the Q-switch (107) and the attenuator (106) to regulate a repetition frequency of the laser radiation 104, such that the repetition frequency of the laser radiation 104 is 10 Hertz (Hz).

In some embodiments, the controller 112 is further configured to control the Q-switch (107) and the attenuator (106), such that a Q-switch delay is from 240 microseconds (μs) to 6 μs. The controller 112 is further configured to control the Q-switch (107) and the attenuator (106) to regulate a minimum average pulse energy of the laser radiation 104 for cavitation bubble generation, such that the minimum average pulse energy of the laser radiation 104 for cavitation bubble generation is 0.5 millijoule (mJ) to 1 mJ. In an example, the minimum pulse energy of the laser radiation 104 that is required to generate a single cavitation bubble 58 is 0.5 to 1 mJ that corresponds to the Q-switch delay of 240 μs to 210 μs. As the Q-switch delay is decreased beyond 240 μs (i.e., 230 μs, or 200 μs, or 150 μs, or 100 μs, or even lower), the pulse energy of the laser radiation 104 is further increased beyond 1 mJ. In some cases, the pulse energy of the laser radiation 104 may be 850 mJ.

In some embodiments, the controller 112 is further configured to control the Q-switch (107) and the attenuator (106), such that a diameter (not shown) of the laser radiation 104 is 8 mm to 10 mm. In an example, the diameter of the laser radiation 104 is 9 mm. The controller 112 is further configured to control the Q-switch (107) and the attenuator (106), such that a focusability of the laser radiation 104 is less than or equal to 2 when the wavelength of the laser radiation 104 is 1064 nm. A size of the high-temperature plasma 54 as well as a maximum radius of the cavitation bubbles 58 is based at least on the focusability of the laser radiation 104 and the diameter of the laser radiation 104. The focusability of the laser radiation 104 is described by diffraction coefficient M2 according to the ISO Standard 11146. This coefficient indicates a divergence angle in relation to the divergence of an ideal Gaussian beam with the same diameter of the beam. In general, the focusability of the laser radiation 104 indicates an ability to focus the laser radiation 104. A high focusability of the laser radiation 104 means that the laser radiation 104 can be focused to very small spots.

The system 100 further includes an energy measuring unit 114 configured to receive the laser radiation 104 from the laser unit 102. The energy measuring unit 114 is configured to generate an energy signal 115 indicating the optical parameters of the laser radiation 104 adjusted by the attenuator 106 and the controller 112. The energy measuring unit 114 may include an energy meter and a pyroelectric sensor. Upon generation of the energy signal 115, the controller 112 may receive the energy signal 115 from the energy measuring unit 114. In some cases, the energy signal is checked manually by an operator and settings of the controller 112 are selected accordingly. Hence, the controller 112 may control the attenuator 106 in the laser unit 102 while receiving information about the optical parameters of the laser radiation 104.

Figure 3A:
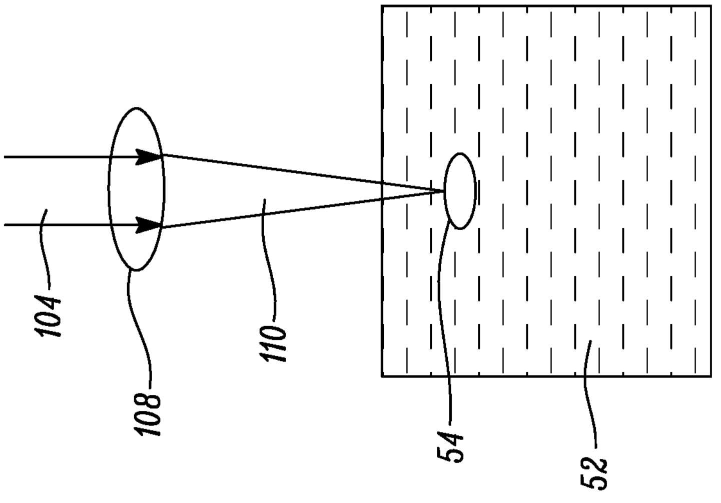
FIG. 3A is schematic view illustrating generation of high-temperature plasma in a liquid medium in the system of FIG. 2.

FIG. 3A is schematic view illustrating generation of the high-temperature plasma 54 in the liquid medium 52 in the system 100 of FIG. 2, according to an embodiment of the present disclosure. The high-temperature plasma 54 is generated when the at least one laser beam 110 with a desirable energy is irradiated through the liquid medium 52 and the optical breakdown in the liquid medium 52 is occurred. Therefore, the high-temperature plasma 54 is generated due to the absorption of enough energy at a focal region and heating of a small volume of the liquid medium 52 up to its ionization temperature.

Figure 3B:
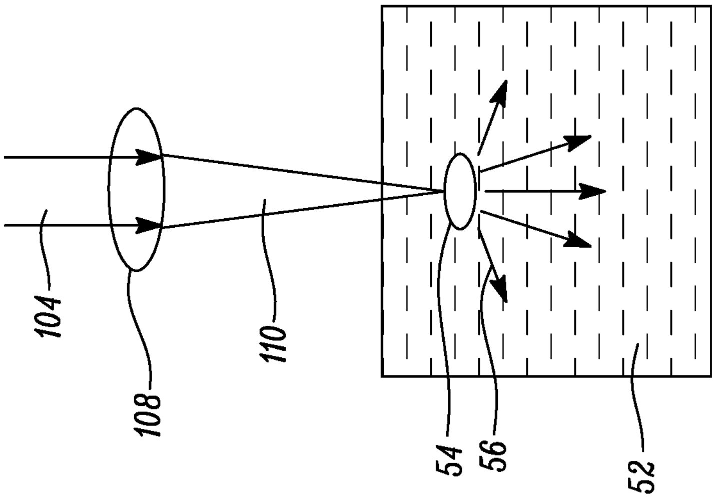
FIG. 3B is a schematic view illustrating generation of a primary shockwave in the liquid medium in the system of FIG. 2.

FIG. 3B is a schematic view illustrating generation of a primary shockwave 56 in the liquid medium 52 in the system 100 of FIG. 2, according to an embodiment of the present disclosure. Due to the concentrated ionized state of a portion of the liquid medium 52 by generation of the high-temperature plasma 54 (shown in FIG. 3A), the surrounding liquid medium 52 gets compressed and a radially outward flow takes place resulting in release of the primary shockwave 56 that starts propagating through the liquid medium 52. Therefore, the primary shockwave 56 is generated at a predetermined location within the liquid medium 52 upon generation of the high-temperature plasma 54.

Figure 3C:
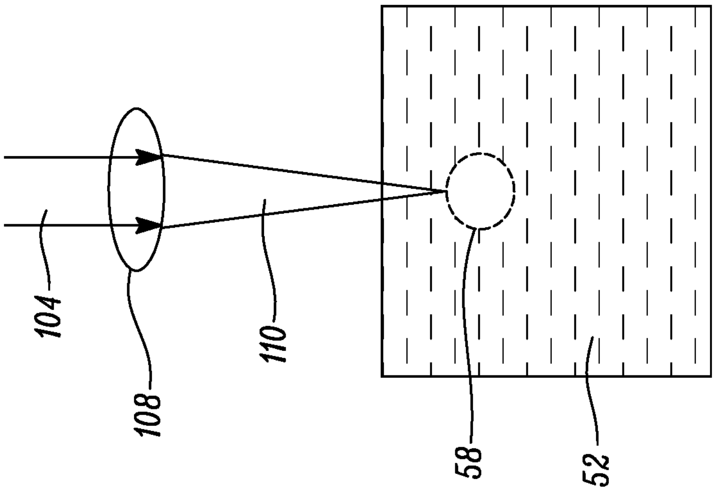
FIG. 3C is a schematic view illustrating generation of a cavitation bubble in the liquid medium in the system of FIG. 2.

FIG. 3C is a schematic view illustrating generation of a cavitation bubble 58 in the liquid medium 52 in the system 100 of FIG. 2, according to an embodiment of the present disclosure. With the propagation of the primary shockwave 56 in the liquid medium 52, the cavitation bubble 58 is generated liquid medium 52. Only a single cavitation bubble 58 is shown in FIG. 3C for illustrative purposes. However, there may be generation of a large number of cavitation bubbles 58 in the liquid medium 52. Therefore, it can be stated that the generation of the high-temperature plasma 54 leads to generation of the cavitation bubbles 58.

Figures 3D, 3E, 3F, 3G:
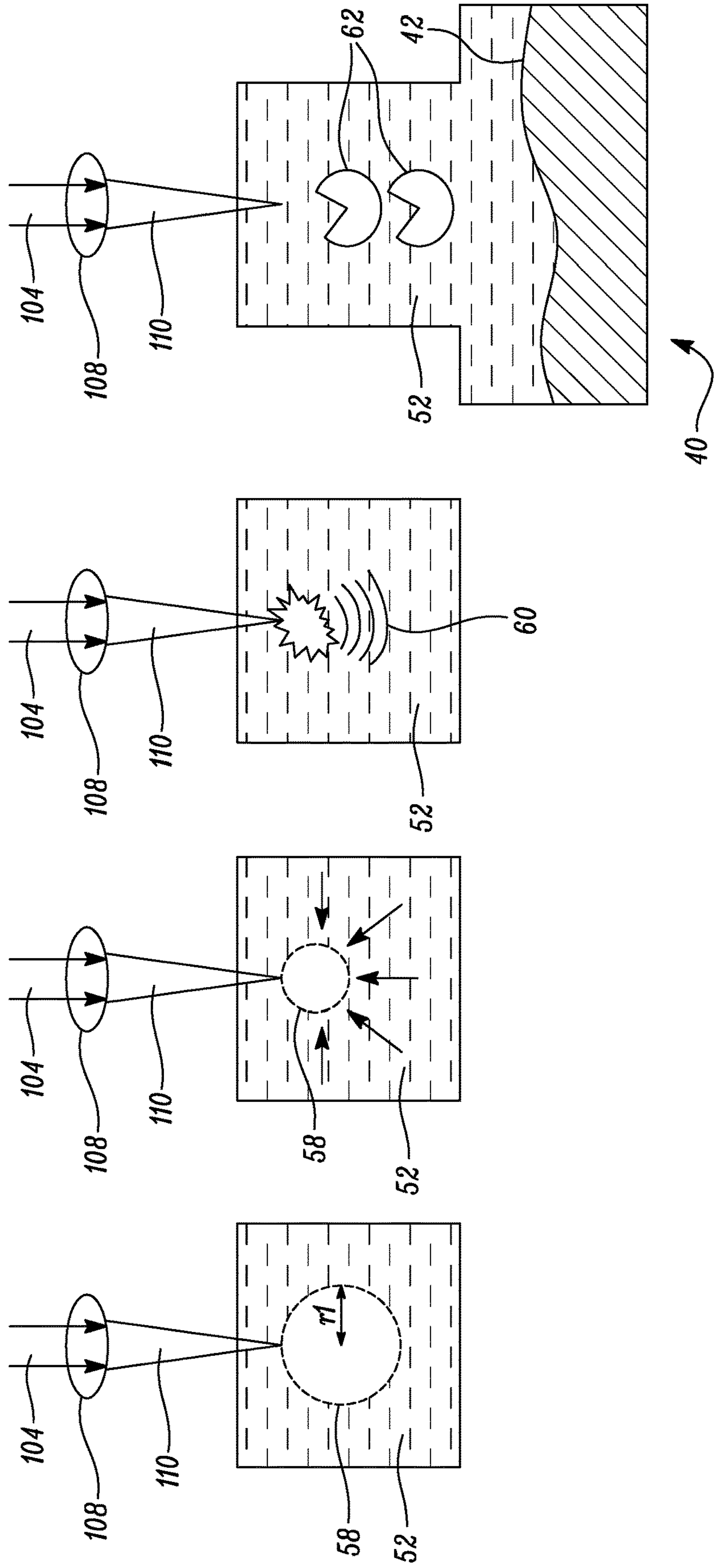
FIG. 3D is a schematic view illustrating expansion of the cavitation bubble in the liquid medium in the system of FIG. 2.
FIG. 3E is a schematic view illustrating contraction of the cavitation bubble in the liquid medium in the system of FIG. 2.
FIG. 3F is a schematic view illustrating implosion of the cavitation bubble and generation of a secondary shockwave in the liquid medium in the system of FIG. 2.
FIG. 3G is a schematic view illustrating generation of microjets in the liquid medium in the system of FIG. 2.

As the cavitation bubble 58 is generated, high pressure inside the cavitation bubble 58 creates continuous isothermal expansion of a wall of the cavitation bubble 58, and the cavitation bubble 58 continues to grow as a sphere. FIG. 3D is a schematic view illustrating the isothermal expansion of the cavitation bubble 58 in the liquid medium 52 in the system 100 of FIG. 2, according to an embodiment of the present disclosure. As a radius of the cavitation bubble 58 increases, a velocity of the wall of the cavitation bubble 58 decreases due to distribution of kinetic energy from the wall-liquid medium interface into a surrounding region. A temperature inside the cavitation bubble 58 gradually decreases to a temperature of the liquid medium 52 due to thermal diffusion. A pressure inside the cavitation bubble 58 attains the saturated vapor pressure. The expansion of cavitation bubble 58 takes place until all the energy is converted into a definite amount of potential energy.

FIG. 3E is a schematic view illustrating contraction of the cavitation bubble 58 in the liquid medium 52 in the system 100 of FIG. 2, according to an embodiment of the present disclosure.

Once the cavitation bubble 58 attains a maximum radius r1 (shown in FIG. 3D), the cavitation bubble 58 undergoes isothermal contraction at the rate of vapor condensation, resulting into the re-increase of vapor temperature and pressure due to strong compression. The isothermal contraction continues till the vapor temperature and pressure reach critical points of the liquid medium 52. A continuous compression of non-condensable air inside the cavitation bubble 58 follows an adiabatic process. It generates a pressure difference between the liquid medium 52 and the wall of the cavitation bubble 58. Due to the pressure difference, a colossal amount of reverse outgoing force is generated instantly and implosion of the cavitation bubble 58 takes place.

FIG. 3F is a schematic view illustrating implosion of the cavitation bubble 58 and generation of a secondary shockwave 60 in the liquid medium 52 in the system 100 of FIG. 2, according to an embodiment of the present disclosure. The secondary shockwave 60 is generated upon implosion of the cavitation bubble 58.

FIG. 3G is a schematic view illustrating generation of microjets 62 in the liquid medium 52 in the system 100 of FIG. 2, according to an embodiment of the present disclosure. As the secondary shockwave 60 propagates through the liquid medium 52, microjets 62 are generated which impinge on the surface 42 and thereby finish the surface 42 of the workpiece 40. Therefore, implosion (shown in FIG. 3F) of the cavitation bubbles 58 causes finishing of the surface 42 of the workpiece 40.

Figure 4:
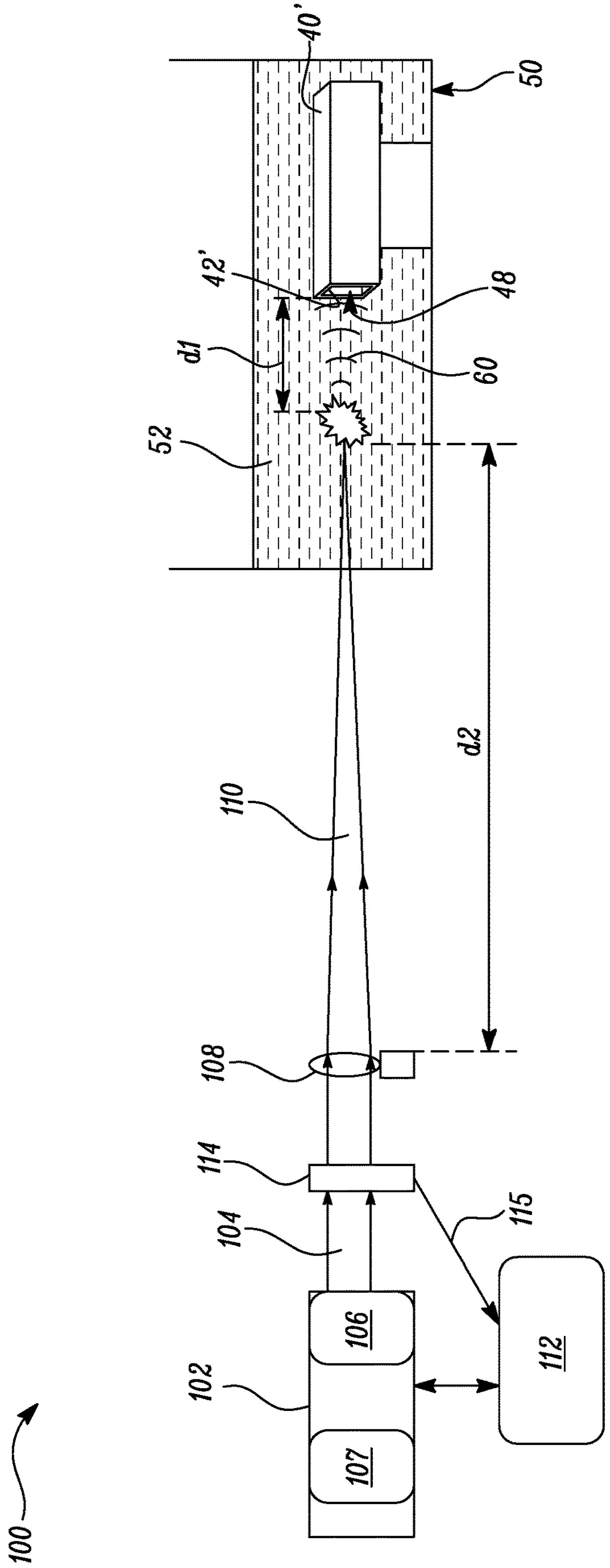
FIG. 4 is a schematic view of the system of FIG. 2, for finishing an internal surface of an at least partially hollow workpiece.

FIG. 4 is a schematic view of the system 100 of FIG. 2 for finishing an internal surface 42' of a workpiece 40' (instead of the workpiece 40), according to an embodiment of the present disclosure. The workpiece 40' is at least partially hollow. In some embodiments, the workpiece 40' can be interchangeably referred to herein as an at least partially hollow workpiece 40'. As shown in FIG. 4, a surface to be finished by the system 100 is the internal surface 42' of the at least partially hollow workpiece 40'. In some embodiments, the internal surface 42' can be interchangeably referred to herein as a surface 42'. The internal surface 42' is shown transparent in some embodiments for illustrative purposes. A location of generation of the high-temperature plasma 54 and implosion of the cavitation bubbles 58 within the cavitation chamber 50 is at least based on focal length of the at least one lens 108 and a position of the at least partially hollow workpiece 40'. In the illustrated embodiment of FIG. 4, implosion of the cavitation bubbles 58 occurs at a distance d1 from the workpiece 40'. The distance d1 is basically a distance between the point of generation of the high-temperature plasma 54 and the workpiece 40. Therefore, the secondary shockwave 60 travels through an opening 48 of the at least partially hollow workpiece 40' and the microjets 62 (shown in FIG. 3G) impinge the internal surface 42' for finishing thereof.

Figure 5B:
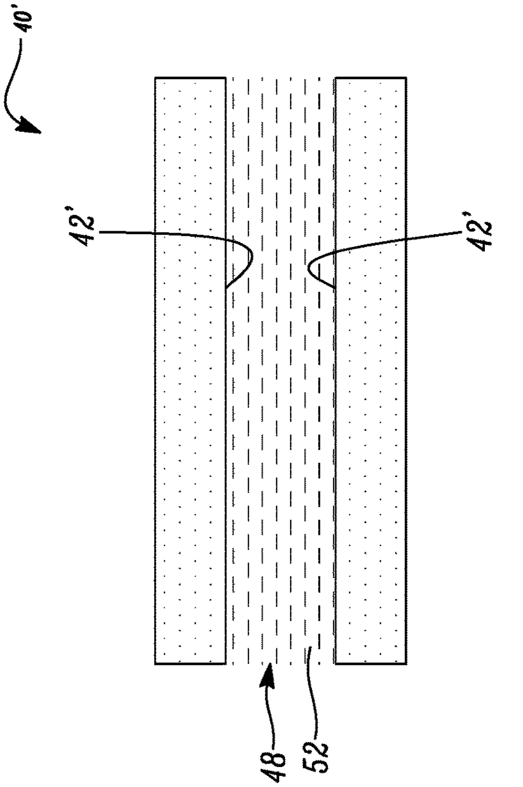
FIG. 5B is a schematic view illustrating the internal surface of the at least partially hollow workpiece of FIG. 5A after the finishing of the internal surface by the system of FIG. 4.
Figure 5A:
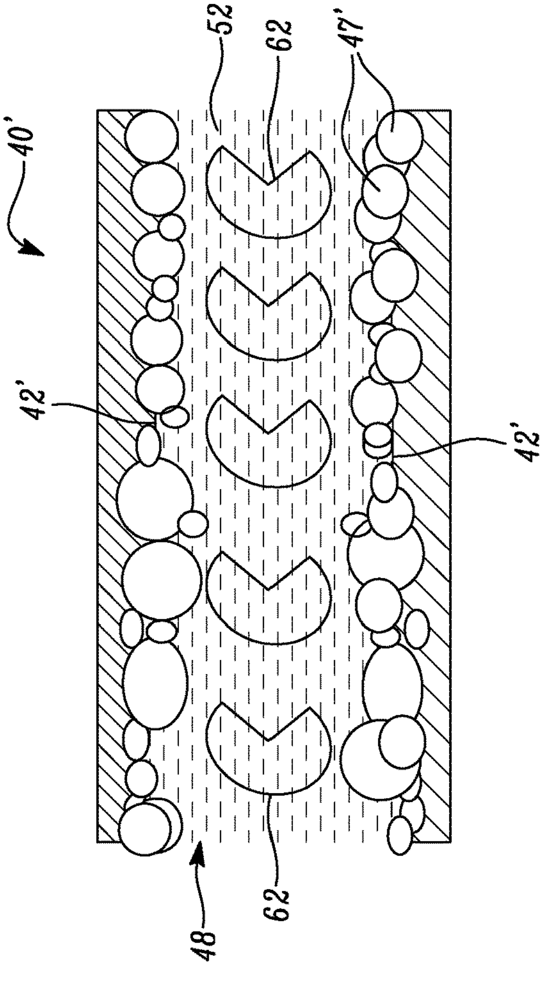
FIG. 5A is a schematic view illustrating the microjets within the at least partially hollow workpiece in the system of FIG. 4.

FIG. 5A is a schematic view illustrating the microjets 62 within the at least partially hollow workpiece 40' in the system 100 of FIG. 4, according to an embodiment of the present disclosure. Specifically, the microjets 62 impinge the internal surface 42' and remove a plurality of impurities 47 present on the internal surface 42'. FIG. 5B is a schematic view illustrating the internal surface 42' of the at least partially hollow workpiece 40' after the finishing of the internal surface 42' in response to impingement of the microjets 62, according to an embodiment of the present disclosure. As shown in FIG. 5B, the plurality of impurities 47 (shown in FIG. 5A) are removed after the generation of the high-temperature plasma 54 and subsequent implosion of the cavitation bubbles 58 within the liquid medium 52.

Figure 6:
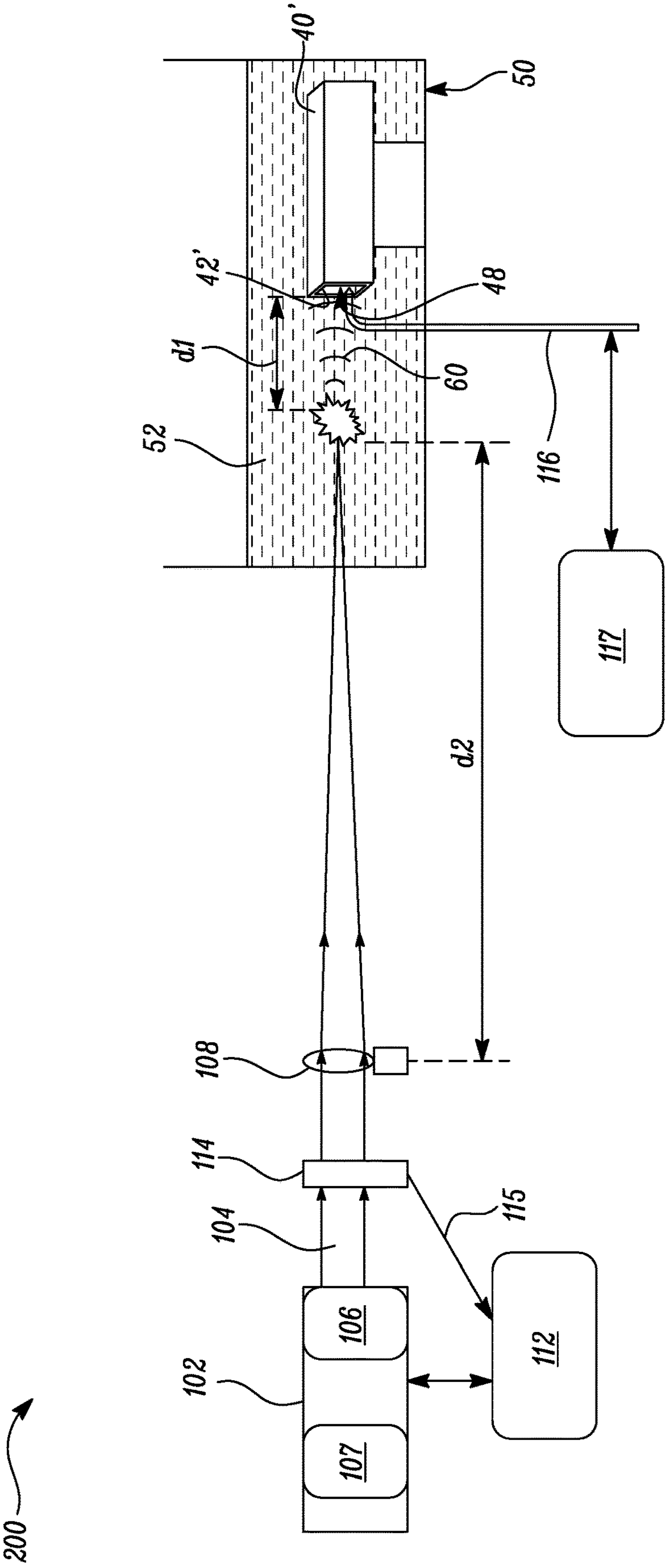
FIG. 6 is a schematic view of a system for finishing an internal surface of an at least partially hollow workpiece.

FIG. 6 is a schematic view of a system 200 for finishing the internal surface 42' of the at least partially hollow workpiece 40' (also shown in FIG. 4), according to an embodiment of the present disclosure. The system 200 is substantially similar to the system 100 of FIG. 4, with common components being referred to by the same reference numerals. However, the system 200 further includes an abrasive supply line 116 configured to deliver a flow of abrasives 55 (shown in FIGS. 7A and 7B) to the surface 42' of the workpiece 40' so as to finish the surface 42' of the workpiece 40' by abrasion. In some embodiments, the abrasive supply line 116 may deliver the flow of abrasives 55 to the surface 42 of the workpiece 40 (shown in FIG. 2).

Figure 7A:
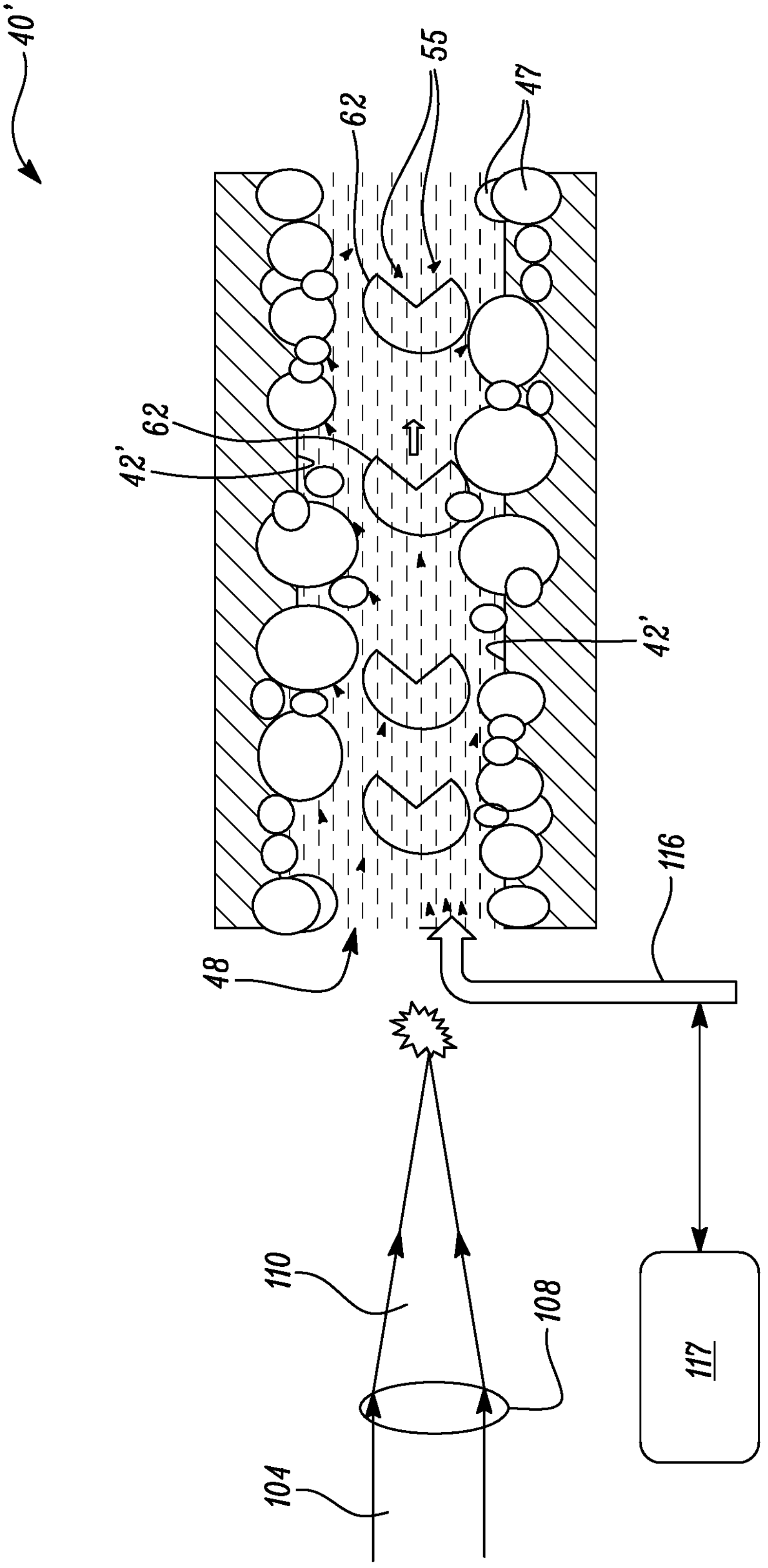
FIG. 7A is a schematic view illustrating an abrasive supply line to deliver a flow of abrasives to the internal surface of the at least partially hollow workpiece in the system of FIG. 6.

FIG. 7A is a schematic view illustrating the abrasive supply line 116 to deliver the flow of abrasives 55 to the internal surface 42' of the at least partially hollow workpiece 40' in the system 200 of FIG. 6, according to an embodiment of the present disclosure. Referring to FIGS. 6 and 7A, the abrasives 55 may flow towards the internal surface 42' through the opening 48. In some embodiments, the abrasive supply line 116 may deliver a slurry comprising a suspended mixture of abrasives 55. The slurry may comprise a concentration of up to 3% (by weight) of abrasives 55 suspended in a liquid. The abrasives 55 may have a mean particle size of from 1 μm to 30 μm. The particle size may also be greater than 30 μm and less than 1 μm. The abrasives 55 may be formed from any suitable abrasive material such as, for example, silicon carbide, cubic boron nitride, alumina, hematite, quartz, and apatite. The high-temperature plasma 54 along with the abrasives 55 may create an abrasive mediated plasma to produce a synergistic effect on generation of the microjets 62 and thereby finish the internal surface 42' of the at least partially hollow workpiece 40'. A controller (117) may control the abrasive supply line 116 in order to adjust the flow of abrasives 55 so as to finish the surface 42' of the workpiece 40' by abrasion.

Figure 7B:
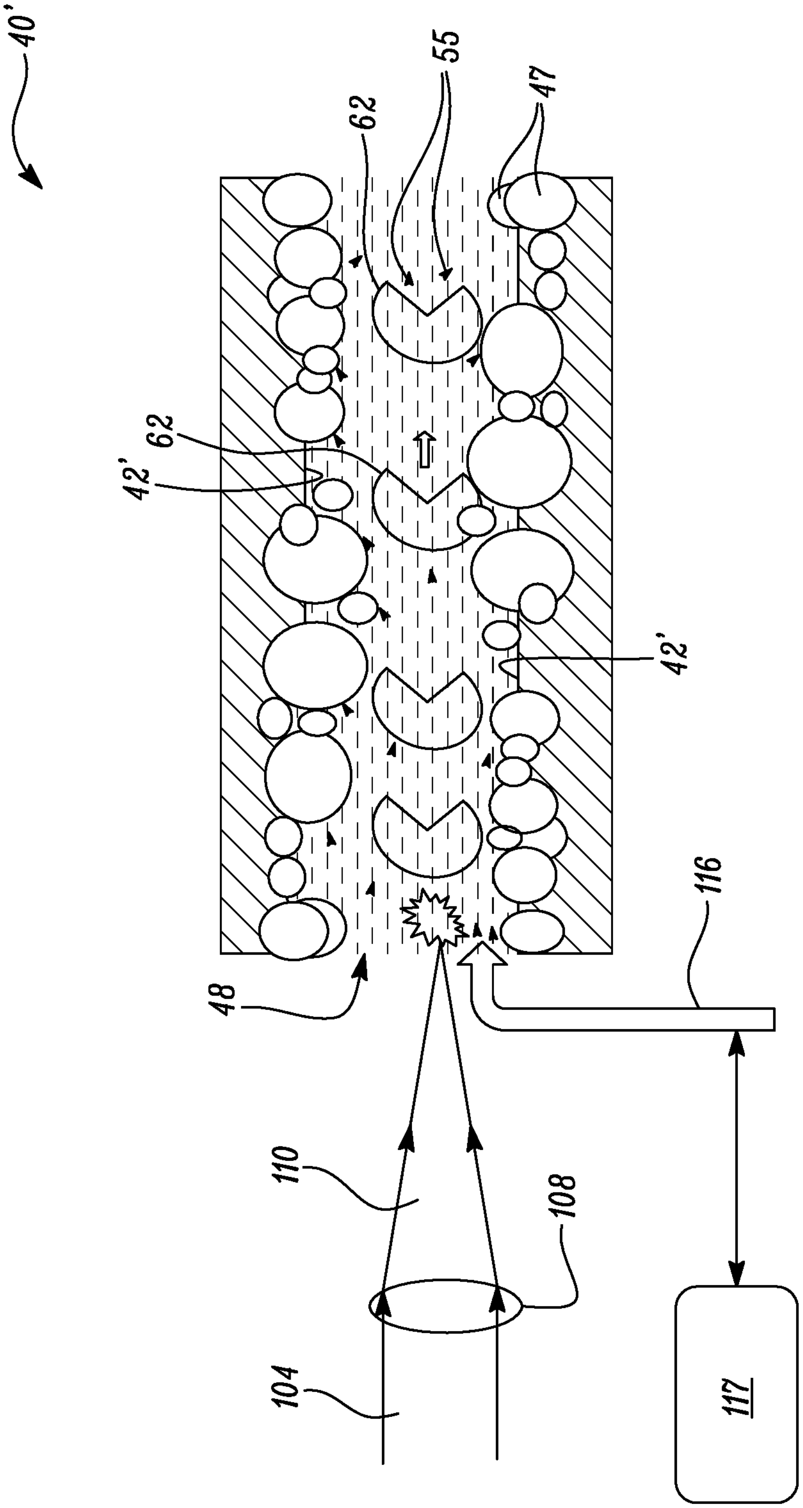
FIG. 7B is a schematic view illustrating the abrasive supply line of FIG. 7A and implosion of cavitation bubbles within the at least partially hollow workpiece.

FIG. 7B is a schematic view illustrating the abrasive supply line 116 of FIG. 7A and implosion of the cavitation bubble 58 within the at least partially hollow workpiece 40', according to an embodiment of the present disclosure. Therefore, the at least one laser beam 110 irradiates through the liquid medium 52 within the at least partially hollow workpiece 40', such that the high-temperature plasma 54 and the cavitation bubbles 58 are generated within the at least partially hollow workpiece 40' so as to finish the internal surface 42' of the at least partially hollow workpiece 40'.

Figure 8:
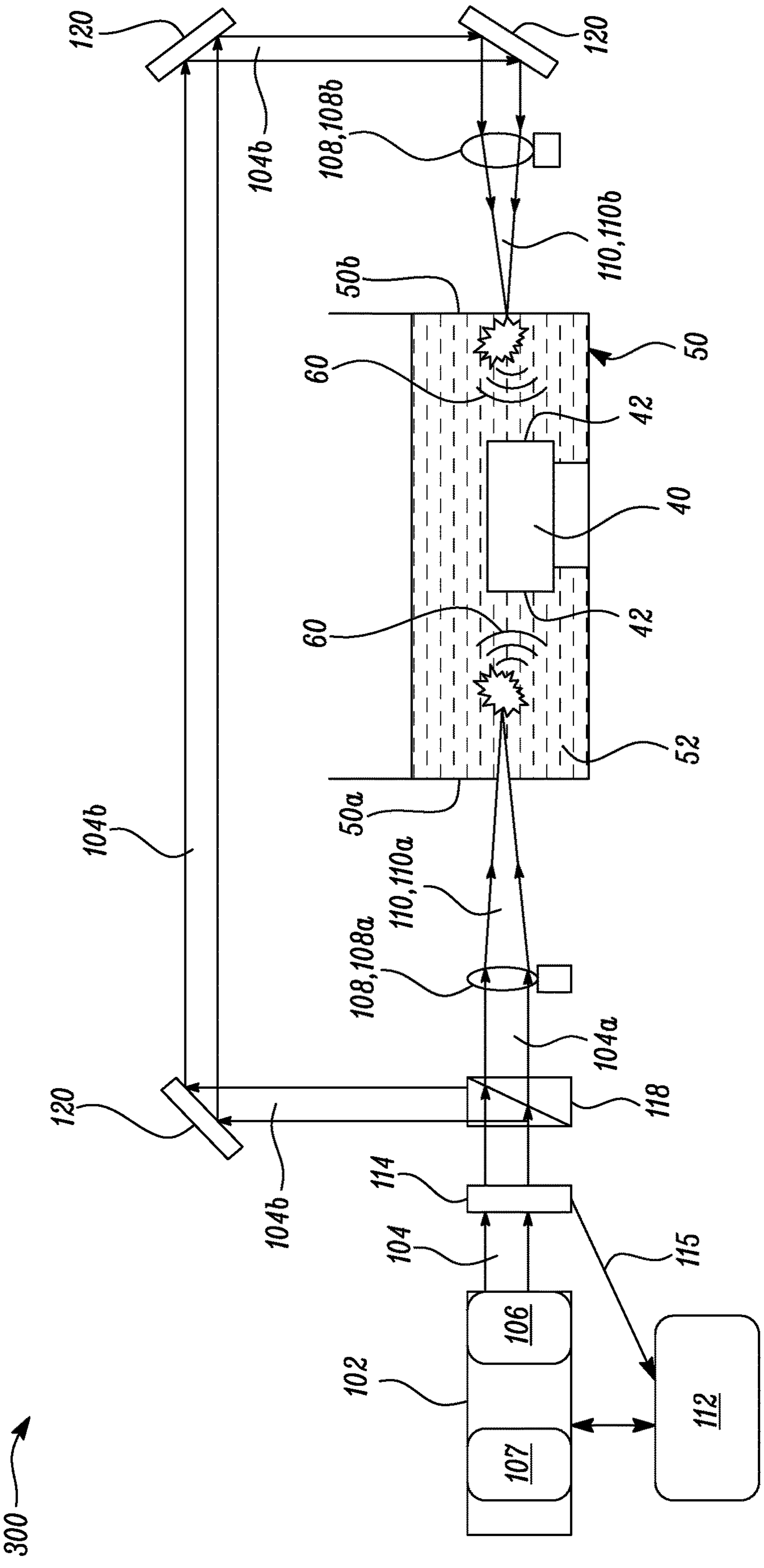
FIG. 8 is a schematic view of a system for finishing a surface of a workpiece.

FIG. 8 is a schematic view of a system 300 for finishing the surface 42 of the workpiece 40 (also shown in FIG. 2), according to an embodiment of the present disclosure. The system 300 is substantially similar to the system 100 of FIG. 2, with common components being referred to by the same reference numerals. However, the system 200 further includes a splitter 118 optically coupled to the laser unit 102 and configured to split the laser radiation 104 into a first split laser beam 104*a* and a second split laser beam 104*b*. Further, in the system 300, the at least one lens 108 includes a first lens 108*a* configured to receive the first split laser beam 104*a* from the splitter 118 and a second lens 108*b* configured to receive the second split laser beam 104*b* from the splitter 118. The first lens 108*a* and the second lens 108*b* may have similar optical characteristics. The first lens 108*a* is configured to focus the first split laser beam 104*a* and the second lens 108*b* is configured to focus the second split laser beam 104*b*.

Further, in the system 300, the at least one laser beam 110 includes a first laser beam 110*a* and a second laser beam 110*b*. The first laser beam 110*a* is transmitted by the first lens 108*a* by focusing the first split laser beam 104*a* and the second laser beam 110*b* is transmitted by the second lens 108*b* by focusing the second split laser beam 104*b*. Moreover, in the system 300, the first lens 108*a* and the second lens 108*b* are disposed on two opposing sides 50*a*, 50*b* of the cavitation chamber 50. Specifically, the first lens 108*a* is disposed on the side 50*a* of the cavitation chamber 50, and the second lens 108*b* is disposed on the side 50*b* of the cavitation chamber 50. The first lens 108*a* faces the second lens 108*b*. The first laser beam 110*a* and the second laser beam 110*b* are substantially parallel to each other. In some embodiments, the first laser beam 110*a* and the second laser beam 110*b* are substantially co-planar. The system 300 further includes at least three mirrors 120 to direct the second split laser beam 104*b* towards the second lens 108*b*. In the illustrated embodiment of FIG. 8, the system 300 includes three mirrors 120.

As the first laser beam 110*a* is transmitted by the first lens 108*a* and the second laser beam 110*b* is transmitted by the second lens 108*b*, the high-temperature plasma 54 (shown in FIG. 3A) is generated at two different locations within the cavitation chamber 50. The generation of the high-temperature plasma 54 at two different locations may improve a speed of finishing the surface 42 of the workpiece 40. Moreover, with the generation of the high-temperature plasma 54 at two different locations, the system 300 may enable simultaneous finishing of surfaces of two workpieces, or two different surfaces of a single workpiece. The inclusion of the splitter 118, the first lens 108*a*, and the second lens 108*b* may enable the system 300 to complete the finishing of the surface 42 of the workpiece 40 in a relatively less time as compared to conventional techniques of surface finishing. Further, there may be no need to move the laser unit 102 and other related equipment for finishing two different surfaces of a workpiece.

Figure 9:
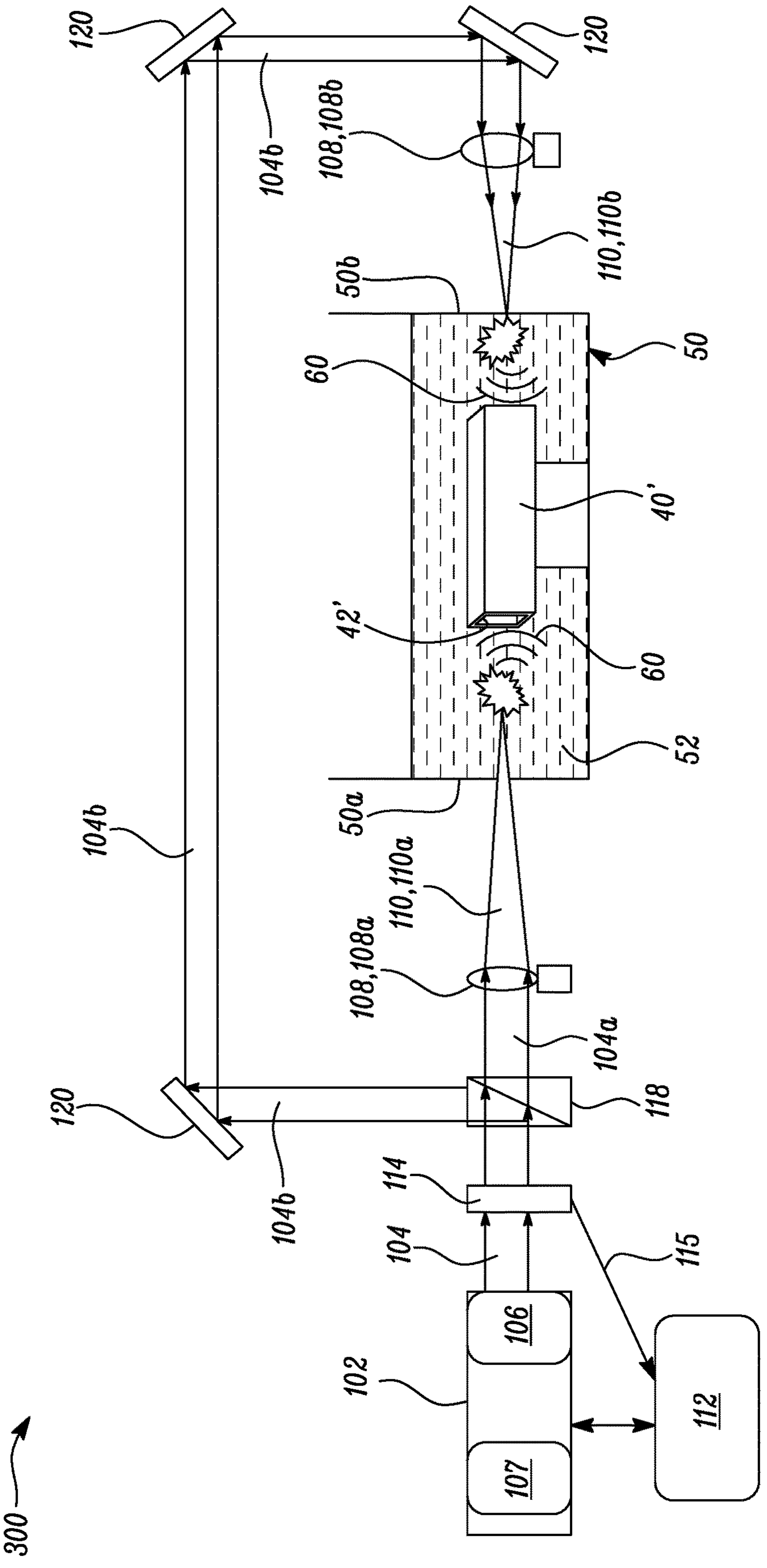
FIG. 9 is a schematic view of the system of FIG. 8 for finishing an internal surface of an at least partially hollow workpiece. The system having lenses disposed on two opposed sides of the cavitation chamber.

FIG. 9 is a schematic view of the system 300 of FIG. 8 for finishing the internal surface 42' of the at least partially hollow workpiece 40' (also shown in FIG. 4). As the first lens 108*a* faces the second lens 108*b*, the system 300 may enable finishing of the internal surface 42' of the at least partially hollow workpiece 40' from its two opposing ends and therefore improve the speed of finishing.

Figure 10:
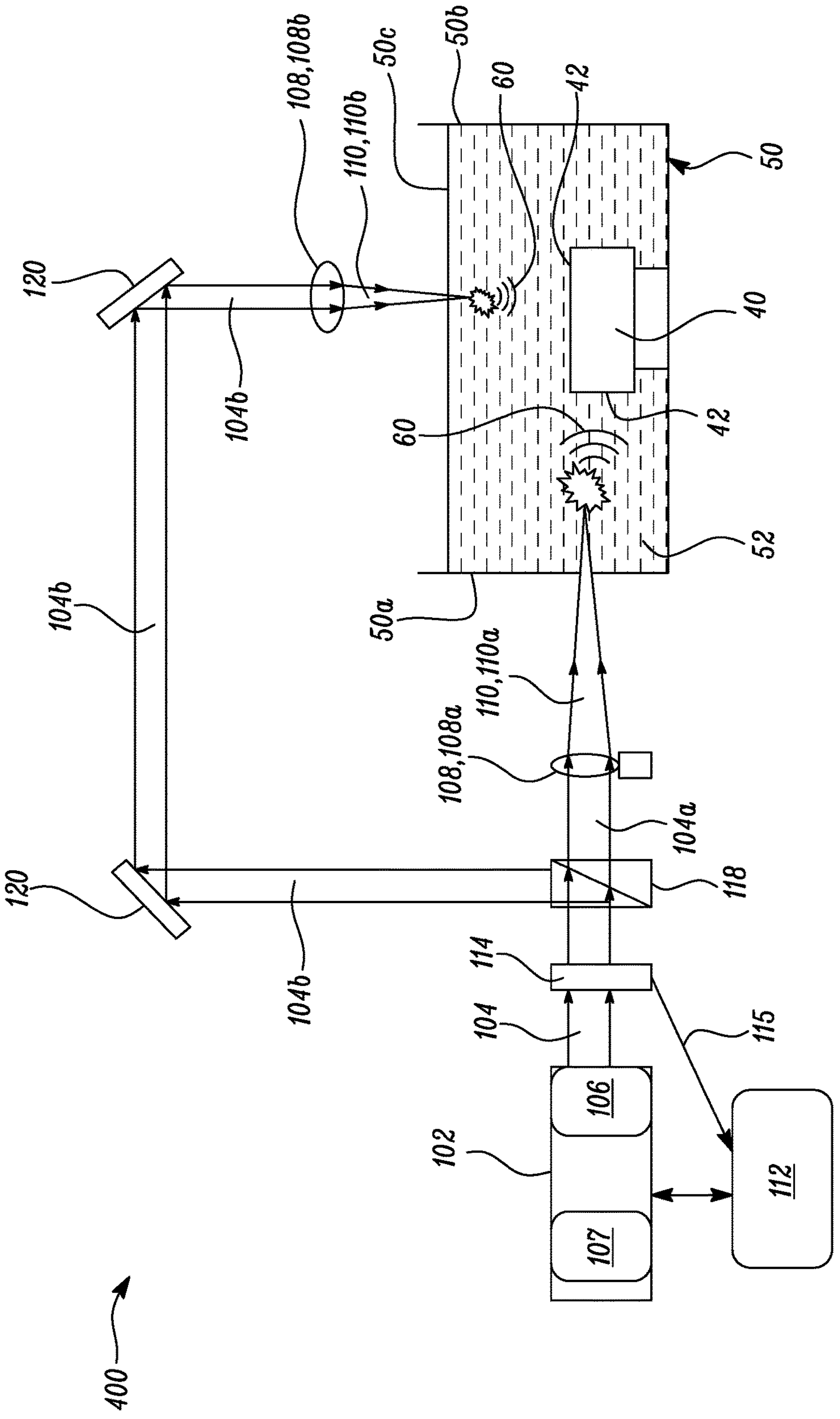
FIG. 10 is a schematic view of a system for finishing a surface of a workpiece, with lenses disposed on two inclined sides of the cavitation chamber.

FIG. 10 is a schematic view of a system 400 for finishing the surface 42 of the workpiece 40 (also shown in FIGS. 2 and 8), according to an embodiment of the present disclosure. The system 400 is substantially similar to the system 300 of FIG. 8, with common components being referred to by the same reference numerals. However, in the system 400, the first lens 108*a* and the second lens 108*b* are disposed on two inclined sides 50*a*, 50*c* (instead of the two opposing sides 50*a*, 50*b*) of the cavitation chamber 50. The first lens 108*a* is inclined to the second lens 108*b*. The first laser beam 110*a* and the second laser beam 110*b* are inclined (substantially perpendicular in the illustrated embodiment of FIG. 10) to each other. As the first lens 108*a* is inclined to the second lens 108*b*, the system 400 may enable simultaneous finishing of two different surfaces of a workpiece. The system 400 further includes at least two mirrors 120 to direct the second split laser beam 104*b* towards the second lens 108*b*. In the illustrated embodiment of FIG. 10, the system 400 includes two mirrors 120.

Figure 11:
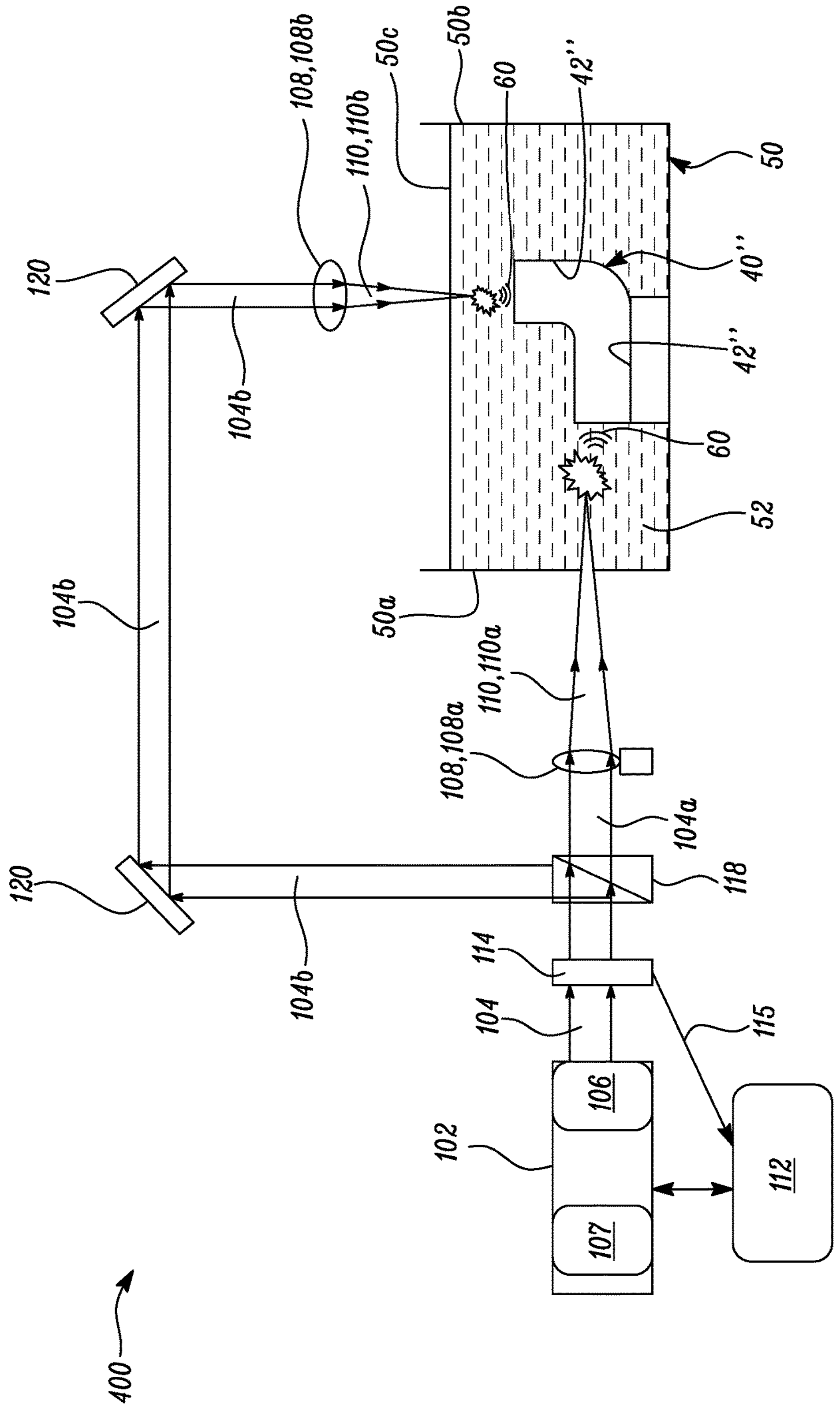
FIG. 11 is a schematic view of the system of FIG. 10 for finishing an internal curved surface of a workpiece.

FIG. 11 is a schematic view of the system 400 of FIG. 10, for finishing an internal curved surface 42" of a workpiece 40", according to an embodiment of the present disclosure. In some embodiments, the internal curved surface 42" can be interchangeably referred to herein as a surface 42". The workpiece 40" is a hollow curved component, such that the generating of the cavitation bubbles 58 (shown in FIG. 3C) finishes the internal curved surface 42" of the hollow curved component (i.e., the workpiece 40").

Figure 12:
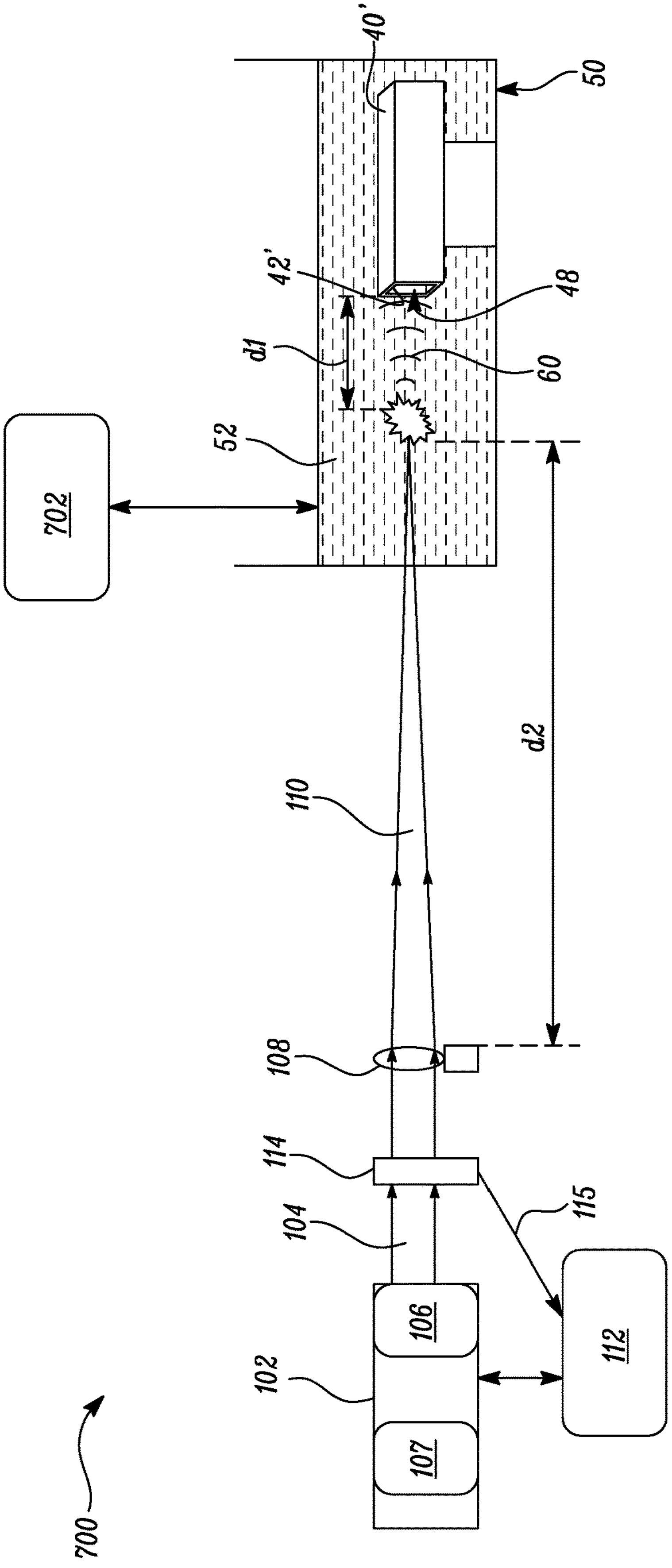
FIG. 12 is a schematic view of a system for finishing an internal surface of an at least partially hollow workpiece, the system including an ultrasonic generator.

FIG. 12 is a schematic view of a system 700 for finishing the internal surface 42' of the at least partially hollow workpiece 40' (also shown in FIG. 4), according to an embodiment of the present disclosure. The system 700 is substantially similar to the system 100 of FIG. 4, with common components being referred to by the same reference numerals. However, the system 700 further includes ultrasonic generator 702 configured to generate the cavitation bubbles 58 (shown in FIG. 3C) in the liquid medium 52 by ultrasonic excitation. The ultrasonic generator 702 is used to excite the liquid medium 52 with a desirable ultrasonic frequency for creating the cavitation bubbles 58 within the liquid medium 52.

Figure 13B:
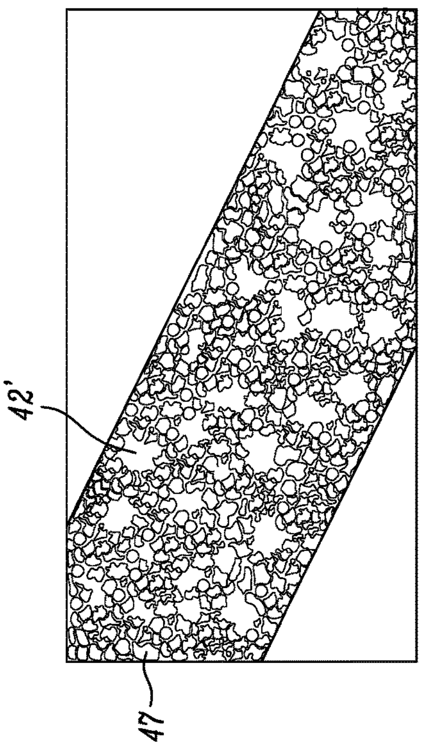
FIG. 13B is a schematic view illustrating texture of an internal surface of the at least partially hollow workpiece of FIG. 13A before finishing of the internal surface.
Figure 13C:
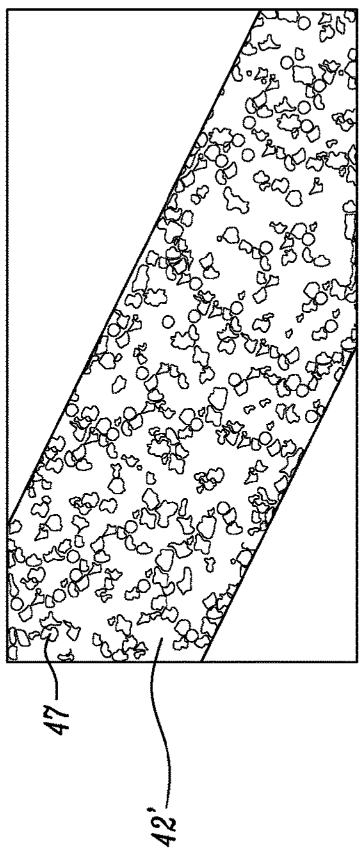
FIG. 13C is a schematic view illustrating texture of the internal surface of the at least partially hollow workpiece of FIG. 13A after finishing of the internal surface.
Figure 13A:
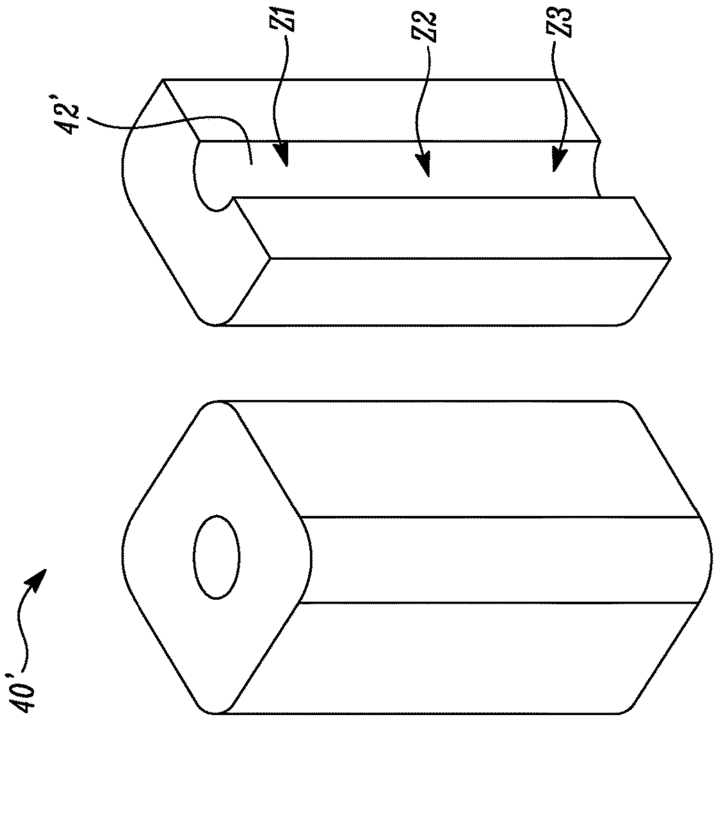
FIG. 13A is a schematic view of an exemplary at least partially hollow workpiece.

FIG. 13A is a schematic view of an exemplary at least partially hollow workpiece 40' that is to be finished by the system 100 of FIG. 4. A length of the at least partially hollow workpiece 40' is divided into three zones, i.e., a first zone Z1, a second zone Z2, and a third zone Z3. FIG. 13B is a schematic view illustrating a texture of the internal surface 42' of the exemplary at least partially hollow workpiece 40' before finishing of the internal surface 42', according to an exemplary embodiment of the present disclosure. FIG. 13C is a schematic view illustrating the texture of the internal surface 42' of the exemplary at least partially hollow workpiece 40' after finishing of the internal surface 42' by the system 100, according to an exemplary embodiment of the present disclosure. Upon comparing FIGS. 13B and 13C, it is apparent that various impurities and irregularities on the internal surface 42' are removed after finishing of the surface 42'. Specifically, the impurities 47 on the internal surface 42' have been reduced after finishing of the surface 42'.

Figure 14B:
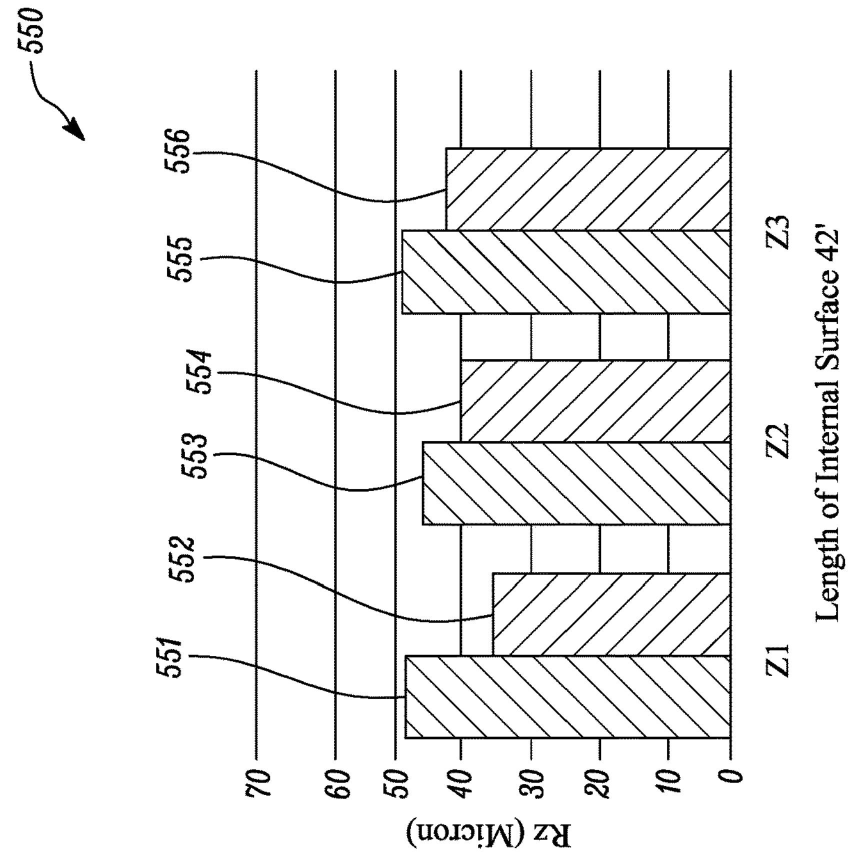
FIGS. 14A and 14B are graphs illustrating surface roughness values before and after finishing the internal surface of the at least partially hollow workpiece of FIG. 13A.
Figure 14A:
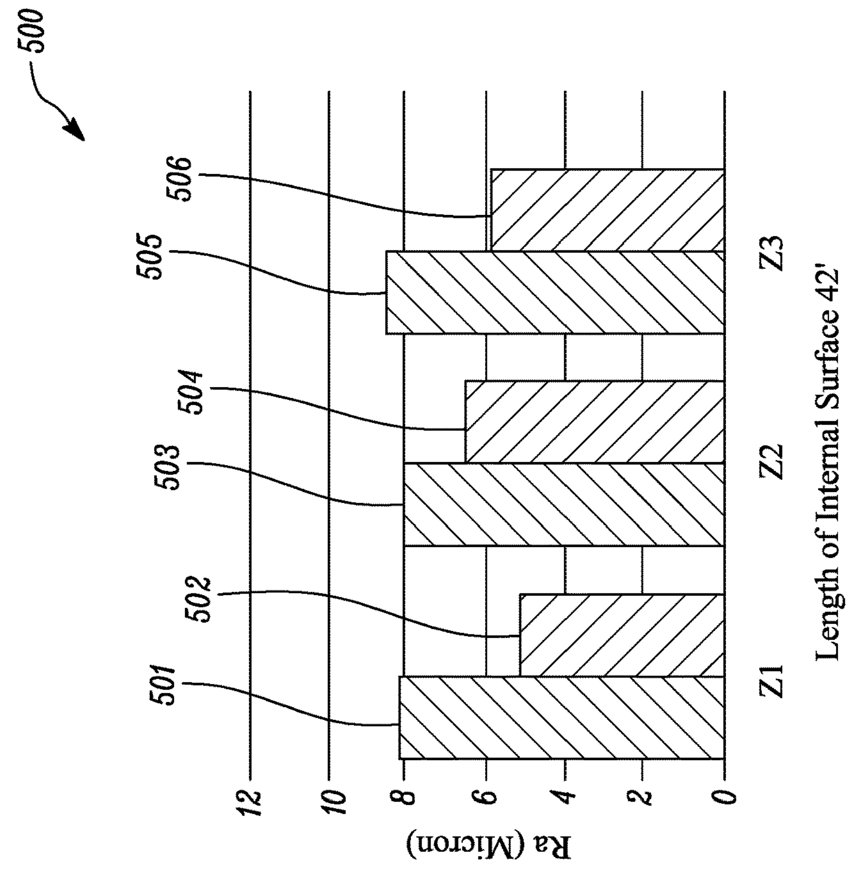

FIG. 14A is a graph 500 illustrating an average surface roughness Ra of the internal surface 42' of the exemplary at least partially hollow workpiece 40' (shown in FIG. 13A) before and after the finishing of the internal surface 42', according to an exemplary embodiment of the present disclosure. In the graph 500, bars 501, 503, 505 depict the average surface roughness Ra of the respective first, second, and third zones Z1, Z2, Z3 of the internal surface 42' before the finishing thereof. Bars 502, 504, 506 depict the average surface roughness Ra of the respective first, second, and third zones Z1, Z2, Z3 of the internal surface 42' after the finishing thereof. After the finishing of the internal surface 42' by the system 100 (shown in FIG. 4), a reduction in the average surface roughness Ra of various zones of the internal surface 42' can be clearly seen in the graph 500.

FIG. 14B is a graph 550 illustrating a maximum surface roughness Rz of the internal surface 42' of the exemplary at least partially hollow workpiece 40' (shown in FIG. 13A) before and after the finishing of the internal surface 42', according to an exemplary embodiment of the present disclosure. In the graph 550, bars 551, 553, 555 depict the maximum surface roughness Rz of the respective first, second, and third zones Z1, Z2, Z3 of the internal surface 42' before the finishing thereof. Bars 552, 554, 556 depict the maximum surface roughness Rz of the respective first, second, and third zones Z1, Z2, Z3 of the internal surface 42' after the finishing thereof. After the finishing of the internal surface 42' by the system 100 (shown in FIG. 4), a reduction in the maximum surface roughness Rz of various zones of the internal surface 42' can be clearly seen in the graph 550.

Figure 15:
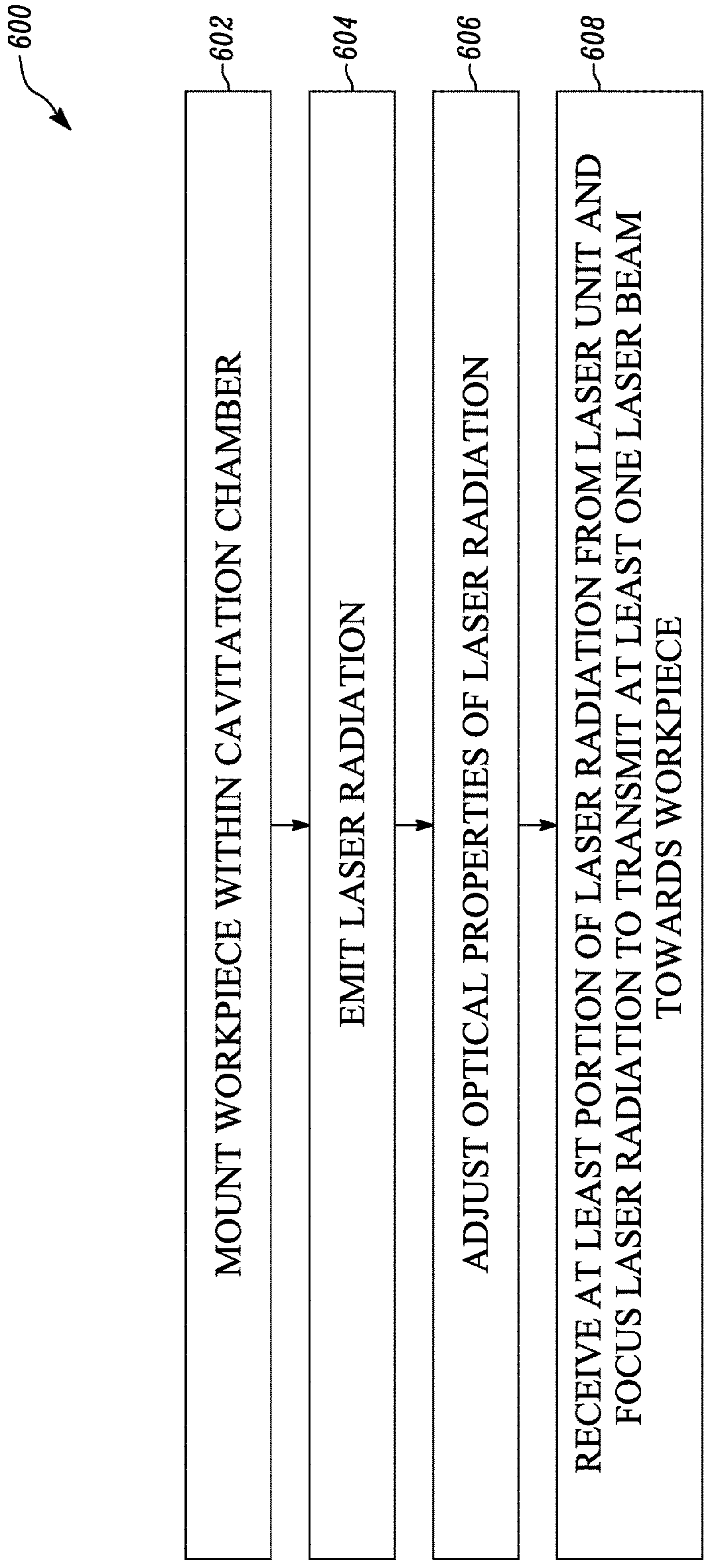
FIG. 15 is a flowchart illustrating a method for finishing a surface of a workpiece according to an embodiment of the present disclosure.

FIG. 15 is a flowchart illustrating a method 600 for finishing the surface 42, 42', 42" of the workpiece 40, 40', 40", respectively, according to an embodiment of the present disclosure. Referring to FIGS. 2, 4, 8, 9, 10, 11, 12, and 15, the method 600 may be implemented by the systems 100, 200, 300, 400. At step 602, the method 600 includes mounting the workpiece 40, 40', 40" within the cavitation chamber 50. At step 604, the method 600 further includes emitting, via the laser unit 102, the laser radiation 104. At step 606, the method 600 further includes adjusting, via the attenuator 106, the optical properties of the laser radiation 104. At step 606, the method 600 further includes receiving, via the at least one lens 108, at least the portion of the laser radiation 104 from the laser unit 102 and focusing the laser radiation 104 to transmit the at least one laser beam 110 towards the workpiece 40, 40', 40". Irradiation of the at least one laser beam 110 through the liquid medium 52 leads to generation of the high-temperature plasma 54 (shown in FIG. 3A) within the cavitation chamber 50.

In some embodiments, the method 600 further includes adjusting, via the attenuator 106, the optical properties of the laser radiation 104 based on a distance d2 (shown in FIG. 4) between the at least one lens 108 and a point of generation of the high-temperature plasma 54, the distance d1 between the point of generation of the high-temperature plasma 54 and the workpiece 40', the maximum radius r1 (shown in FIG. 3D) of the cavitation bubbles 58, and a density of the liquid medium 52.

In some embodiments, the method 600 further includes controlling the Q-switch (107) and attenuator (106) to operate the laser unit 102 in the pulse mode based on the breakdown threshold of the liquid medium 52. In some embodiments, controlling the Q-switch (107) and the attenuator (106) further includes regulating the pulse duration, the wavelength, the minimum average pulse energy for cavitation bubble generation, and the repetition frequency of the laser radiation 104.

Referring to FIGS. 2 to 15, in some embodiments, the generation of the high-temperature plasma 54 (shown in FIG. 3A) further leads to generation of the primary shockwave 56 (shown in FIG. 3B) at the predetermined location within the liquid medium 52. The generation of the high-temperature plasma 54 further leads to generation of the cavitation bubbles 58 (shown in FIG. 3C) within the liquid medium 52 upon generation of the primary shockwave 56. The generation of the high-temperature plasma 54 further leads to implosion of the cavitation bubbles 58. The generation of the high-temperature plasma 54 further leads to generation of the secondary shockwave 60 (shown in FIG. 3F) upon the implosion of the cavitation bubbles 58. The generation of the high-temperature plasma 54 further leads to generation and propagation of the microjets 62 (shown in FIG. 3G) upon generation of the secondary shockwave 60.

Referring to FIGS. 3A to 3G, 4, and 15, the method 600 further includes generation of the high-temperature plasma 54 within the at least partially hollow workpiece 40'. The generation of the high-temperature plasma 54 within the at least partially hollow workpiece 40' further leads to generation of the primary shockwave 56 within the at least partially hollow workpiece 40'. The generation of the high-temperature plasma 54 within the at least partially hollow workpiece 40' further leads to generation of the cavitation bubbles 58 within the at least partially hollow workpiece 40' upon generation of the primary shockwave 56 within the at least partially hollow workpiece 40'. The generation of the high-temperature plasma 54 within the at least partially hollow workpiece 40' further leads to implosion of the cavitation bubbles 58 within the at least partially hollow workpiece 40' through interaction of the cavitation bubbles 58 with the internal surface 42' of the at least partially hollow workpiece 40' and through interaction of the cavitation bubbles 58 with each other. The generation of the high-temperature plasma 54 within the at least partially hollow workpiece 40' further leads to generation of the secondary shockwave 60 within the at least partially hollow workpiece 40' upon the implosion of the cavitation bubbles 58 within the at least partially hollow workpiece 40'. The generation of the high-temperature plasma 54 within the at least partially hollow workpiece 40' further leads to generation and propagation of the microjets 62 within the at least partially hollow workpiece 40' upon generation of the secondary shockwave 60 within the at least partially hollow workpiece 40'. The microjets 62 impinge on the internal surface 42' and thereby finish the internal surface 42' of the at least partially hollow workpiece 40'.

Referring to FIGS. 6, 7A, 7B, and 15, the method 600 may further include delivering, via the abrasive supply line 116, the flow of abrasives 55 to the surface 42' of the workpiece 40'. The method 600 may further include controlling the abrasive supply line 116 in order to adjust the flow of abrasives 55 so as to finish the surface 42' of the workpiece 40' by abrasion.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A system for finishing a surface of a workpiece, the system comprising:

a laser unit configured to emit a laser radiation;

an attenuator disposed within the laser unit and configured to adjust optical parameters of the laser radiation;

a cavitation chamber storing a liquid medium, wherein the workpiece is mounted within the cavitation chamber and is in contact with the liquid medium;

at least one lens configured to receive at least a portion of the laser radiation from the laser unit and focus the portion of the laser radiation to transmit at least one laser beam towards the workpiece;

a Q-switch disposed within the laser unit; and a controller communicably coupled to the attenuator and configured to:

control the Q-switch and the attenuator to operate the laser unit in a pulse mode based on a breakdown threshold of the liquid medium, wherein a high-temperature plasma is generated upon optical breakdown in the liquid medium via the at least one laser beam;

control the attenuator such that the high-temperature plasma is generated within the cavitation chamber upon irradiation of the at least one laser beam through the liquid medium, wherein the generation of the high-temperature plasma leads to generation of cavitation bubbles, and wherein an implosion of the cavitation bubbles causes finishing of the surface of the workpiece;

control the Q-switch and the attenuator to regulate a pulse duration, a wavelength, a minimum average pulse energy for cavitation bubble generation, and a repetition frequency of the laser radiation, such that:

the pulse duration of the laser radiation is 5 to 6 ns;

the wavelength of the laser radiation is 213 to 1064 nm;

the minimum average pulse energy of the laser radiation for cavitation bubble generation is 0.5 to 1 mJ; and the repetition frequency of the laser radiation is 10 Hertz; and control the Q-switch and the attenuator, such that:

a Q-switch delay is from 240 to 6 μs;

a focusability of the laser radiation is less than or equal to 2 when the wavelength of the laser radiation is 1064 nm; and a diameter of the laser radiation is 8 to 10 mm.

2. The system of claim 1, further comprising an abrasive supply line configured to deliver a flow of abrasives to the surface of the workpiece so as to finish the surface of the workpiece by abrasion.

3. The system of claim 1, wherein the workpiece is at least partially hollow, and the surface is an internal surface of the at least partially hollow workpiece, and the at least one laser beam is configured to irradiate through the liquid medium within the at least partially hollow workpiece, such that the high-temperature plasma and the cavitation bubbles are generated within the at least partially hollow workpiece so as to finish the internal surface of the at least partially hollow workpiece.

4. The system of claim 1, further comprising an energy measuring unit configured to receive the laser radiation from the laser unit, wherein the energy measuring unit is configured to generate an energy signal indicating the optical parameters of the laser radiation adjusted by the attenuator and the controller.

5. The system of claim 1, further comprising an ultrasonic generator configured to generate the cavitation bubbles in the liquid medium by ultrasonic excitation.

6. The system of claim 1, further comprising a splitter optically coupled to the laser unit and configured to split the laser radiation into a first split laser beam and a second split laser beam, wherein:

the at least one lens comprises a first lens configured to receive the first split laser beam and a second lens configured to receive the second split laser beam, the first lens configured to focus the first split laser beam and the second lens configured to focus the second split laser beam; and the at least one laser beam comprises a first laser beam and a second laser beam, such that the first laser beam is transmitted by the first lens by focusing the first split laser beam and the second laser beam is transmitted by the second lens by focusing the second split laser beam.

7. The system of claim 6, wherein the first lens and the second lens are disposed on two opposing sides of the cavitation chamber, such that the first lens faces the second lens, and the first laser beam and the second laser beam are substantially parallel to each other.

8. The system of claim 7, further comprising at least three mirrors to direct the second split laser beam towards the second lens.

9. The system of claim 6, wherein the first lens and the second lens are disposed on two inclined sides of the cavitation chamber, such that the first lens is inclined to the second lens, and the first laser beam and the second laser beam are inclined to each other.

10. The system of claim 9, further comprising at least two mirrors to direct the second split laser beam towards the second lens.

11. The system of claim 1, wherein the workpiece is a hollow curved component and the surface is an internal curved surface of the hollow curved component.

12. The system of claim 1, wherein the at least one lens is a biconvex lens or a plano-convex lens.

* * * * *